United States Patent
Carmichael

(10) Patent No.: US 7,552,192 B2
(45) Date of Patent: Jun. 23, 2009

(54) MASSIVELY PARALLEL COMPUTER NETWORK-UTILIZING MPACT AND MULTIPOINT PARALLEL SERVER (MPAS) TECHNOLOGIES

(76) Inventor: Ronnie Gerome Carmichael, 19 Merrick Ave., Springfield, MA (US) 01109

(*) Notice: Subject to any disclaimer, the term of this patent is extended or adjusted under 35 U.S.C. 154(b) by 1209 days.

(21) Appl. No.: 10/326,034

(22) Filed: Dec. 18, 2002

(65) Prior Publication Data

US 2004/0122888 A1    Jun. 24, 2004

(51) Int. Cl.
  *G06F 15/16* (2006.01)
  *G06F 15/173* (2006.01)
(52) U.S. Cl. ............................................ 709/217
(58) Field of Classification Search ........... 700/86–104; 709/217
  See application file for complete search history.

(56) References Cited

U.S. PATENT DOCUMENTS

| | | | | |
|---|---|---|---|---|
| 5,426,645 A * | 6/1995 | Haskin | ........................ | 370/477 |
| 5,539,660 A * | 7/1996 | Blair et al. | ................... | 370/380 |
| 5,583,868 A * | 12/1996 | Rashid et al. | ................ | 370/394 |
| 5,608,448 A * | 3/1997 | Smoral et al. | .................. | 725/92 |
| 5,640,194 A * | 6/1997 | Suzuki et al. | ................... | 725/92 |
| 5,671,386 A * | 9/1997 | Blair et al. | ....................... | 711/5 |
| 5,678,061 A * | 10/1997 | Mourad | ........................ | 710/21 |
| 5,815,793 A * | 9/1998 | Ferguson | ..................... | 725/131 |
| 5,926,649 A * | 7/1999 | Ma et al. | ........................ | 710/6 |
| 5,956,716 A * | 9/1999 | Kenner et al. | ................... | 707/10 |
| 6,003,045 A * | 12/1999 | Freitas et al. | ................ | 707/205 |
| 6,018,765 A * | 1/2000 | Durana et al. | ................ | 709/217 |
| 6,044,080 A | 3/2000 | Antonov | | |
| 6,061,504 A * | 5/2000 | Tzelnic et al. | ............... | 709/219 |
| 6,085,251 A * | 7/2000 | Fabozzi, II | ................... | 709/230 |
| 6,105,029 A * | 8/2000 | Maddalozzo et al. | .......... | 707/10 |
| 6,181,867 B1 * | 1/2001 | Kenner et al. | .................. | 386/46 |
| 6,253,247 B1 * | 6/2001 | Bhaskar et al. | .............. | 709/237 |
| 6,374,336 B1 * | 4/2002 | Peters et al. | ................. | 711/167 |
| 6,415,373 B1 * | 7/2002 | Peters et al. | ................. | 711/167 |
| 6,449,730 B2 * | 9/2002 | Mann et al. | ..................... | 714/6 |
| 6,496,856 B1 * | 12/2002 | Kenner et al. | ............... | 709/218 |
| 6,529,994 B1 * | 3/2003 | Bleidt et al. | ................. | 711/114 |
| 6,557,030 B1 * | 4/2003 | Hoang | ......................... | 709/217 |
| 6,563,821 B1 * | 5/2003 | Hong et al. | .................. | 370/389 |
| 6,665,726 B1 * | 12/2003 | Leighton et al. | ............ | 709/231 |

OTHER PUBLICATIONS

Jason S. King, Parallel FTP Performance in a High-Bandwidth, High-Latency WAN, Nov. 10, 2000, pp. 1-8, US Department of Energy by the University of California, Lawrence Livermore National Laboratory, under Contract No. W -7405-Eng-48, UCRL-MI-142491.

(Continued)

*Primary Examiner*—George C Neurauter, Jr.

(57) ABSTRACT

A Process and apparatus for high speed data transfer for communications networks, computers, computer networks and network interfaces, via software, and apparatus mimicking the human brain and nervous system, by utilization of highly distributed storage of data and massively parallel data transfer and reception over multiple channels/pathways resulting in greater bandwidth than that of serial transmissions. The primary purpose of which is to provide highspeed data transfer for data-on-demand networks such as Video-on-Demand. Therefore, the processes, architectures and topologies described herein may be interfaced with satellite systems, CATV systems, Virtual Networks, wireless services; utilized by Internet Service Providers, and any broadcaster/service provider capable of multiple channel/frequency broadcasts and reception via satellite, cable, terrestrial, or other mediums.

29 Claims, 22 Drawing Sheets

MPACT DMS to Service Provider
Transmission / Broadcast Equipment Interface

OTHER PUBLICATIONS

Pluris Inc., Pluris Massively Parallel Routing (white Paper), Feb. 1998, Web Publication.

Juan M. Solá-Sloan, Isidoro Couvertier Ph.D., A TCP/IP Offloading Framework for a TCP/IP Offloading Implementation, Mar. 11, 2002, University of Puerto Rico, Mayagüez, Puerto Rico.

Juan M. Solá-Sloan, Isidoro Couvertier Ph.D., A Parallel TCP/IP Offloading Framework for a TCP/IP Offloading Implementation, Oct. 30-31, 2002, IP Based SoC Design 2002, University of Puerto Rico, Mayagüez, Puerto Rico.

Cheng Jin, David Wei, Steven H. Low, Julian Bunn, Hyojeong D. Choe, John C. Doyle, Harvey Newman, Sylvain Ravot, and Suresh Singh (Caltech) Fernando Paganini (UCLA) Gary Buhrmaster and Les Cottrell (Stanford Linear Accelerator Center) Olivier Martin (Cern, Geneva) Wu-Chun Feng (Los Alamos National Laboratory) Fast TCP: From Theory to Experiments, IEEE Network, Jan./Feb. 2005.

* cited by examiner

MPACT DMS to Service Provider
Transmission / Broadcast Equipment Interface

DMS manipulation of incoming packets for parallel or Large scale parallel transmission DMU as an element manager Data transfer employing MPAS & MPACT technologies Class "A" Transceiver Class "B" Transceiver Integrated Circiut (IC) / package
containing multiple tuners Example 1

Communications Hub

MPAS SRU

MPAS SRU Option A

MPAS SRU Option B

Consumer Permission Cable connected
to Customer Audio/Video equipment

Consumer Permission Cable with connecters

Permission ciruitry installed in an audio/video recoeding device such as a VCR, CD-R, etc.

Customer Permission Circuitry for installation into audio/video recording devices Enhanced Personal Storage Device (E-PSD)

MPACT in FTP application

Primary MPAS Stages

MPAS-2, 3 in FTP application

Typical FTP software application

Parallel Data Transfer
Application Software

MASSIVELY PARALLEL COMPUTER NETWORK-UTILIZING MPACT AND MULTIPOINT PARALLEL SERVER (MPAS) TECHNOLOGIES

CROSS-REFERENCE TO RELATED APPLICATIONS

This invention references the following provisional patents:

| Title | Application # | Confirmation # |
|---|---|---|
| Massively Parallel Computer Network - Utilizing Multipoint Parallel Server (MPAS) | 60/335,751 | 1746 |
| Massively Parallel Computer Network - Utilizing Multipoint Parallel Server (MPAS) with Enhanced Personal Storage Device (E-PSD) | 60/431,410 | 8729 |

STATEMENT REGARDING FEDERALLY SPONSORED RESEARCH OR DEVELOPMENT

This invention has not received federal sponsorship for research or development.

BACKGROUND OF THE INVENTION

1. Field of the Invention

The present invention relates to a process utilizing data control methods and associated apparatus which provides for high speed data transfer by means of highly distributed data storage, and massively parallel data transfer and reception over multiple pathways.

Corresponding phases of the data transfer process have been modified in order to alleviate bandwidth bottlenecks which would normally occur when used with conventional computers, local area networks (LANs), wide area networks (WANs), metropolitan area networks (MANs), and intermediary data storage, communications systems and broadcast networks; for example: telephone company central offices, cable television (CATV) broadcast facilities, satellite uplink centers, web hosting companies, and so on.

The invention regards the prerecorded audio and video content of Video-on-Demand networks as data and manages it accordingly. As a result, the process is equally capable of being utilized with data files of all types. Because the of its orientation within the service providers network and throughout the data path, in addition to multi platform capabilities, the invention may be interfaced with many disparate systems.

2. Description of Related Art

The current state of Video-On-Demand technology primarily relates to a "program provider" such as "Pay-Per-View" (or in some cases individual cable television companies), supplying subscribers with a predetermined choice of movies each month, with predetermined times at which the movies will be shown. If the subscriber wishes to view the movie he/she "orders" the movie from the service provider to which he/she receives cable or satellite television service.

The overall technical process is such that the program provider normally "airs" movies in a manner similar to traditional television broadcast networks. However, since the program provider is showing multiple movies and providing services to a cable or satellite television network, the provider multiplexes the signals onto a single "feed", and acquires a data connection such as ATM over SONET to the service provider who then interfaces this "feed" to its broadcast equipment, for dissemination of signals to the appropriate subscribers within the network.

The disadvantages to this are that subscribers are restricted to a relatively small number of movies at any time, and because of the prescheduled times for "airing" the movies, conflicts with subscriber schedules are inevitable. This raises the problem of intellectual property security, since many subscribers feel the need to record such movies when schedule conflicts arise.

Computer networks provide many file management capabilities which would be useful in this arena, and to that end over the last few years some have experimented with using traditional computer networks to supply greater versatility to movie selection in much the same manner as a typical computer Wide Area Network (WAN) functions, with disappointing results.

The problem is primarily one of bandwidth. Movie files with DVD encoding average around six gigabits in size, while this form of encoding currently presents the best movie quality, MPEG2 is the standard at which most movies are transmitted to CATV subscribers with less quality. Even with this encoding process, the resulting data files are too large for all but the smallest networks because of data traffic congestion and limited bandwidth.

When one realizes that even if a subscriber had a T1 connection (approximately 1.5 Mb/s), it would take more than an hour to download a DVD quality movie, the problems of bandwidth as they relate to Video-On-Demand come into perspective; especially since T1 connections average several hundred dollars per month, depending upon the geographic area.

Another example of the problem is found with both cable modems which are associated with CATV systems, and DSL which is associated with telephony networks. Because of network architecture and associated protocols, when the number of subscribers on these networks increase, the amount of continual bandwidth tends to decrease.

The common ground upon which all of the aforementioned methods of data transmission rests, also happens to be one of their weakest links, it is that traditional data transmissions are serial in nature.

The end result is that the main weaknesses which are inherent in both the computer and communications industries combine to prohibit the cost efficient bandwidth which would be required to develop a Data-on-Demand network with unlimited Video, Audio and other data files (such as video/PC games, and sheet music as an option to accompany audio files, computer programs, and so on), which could adequately serve hundreds of thousands of subscribers or more.

SUMMARY OF THE INVENTION

It is the object of this invention to provide apparatus and processes in which data may be transferred and received by way of parallel and massively parallel data pathways hence enabling substantially greater bandwidth than serial transmissions alone can achieve. This would allow for the routine download of very large files (for example movie and medical files) to be achieved in seconds even on the largest networks; and when used on a large scale would open the way for the Internet to operate at Gigabit per second bandwidth and beyond.

In order to accomplish this, preexisting computers, computer networks, communications networks, routers, their interfaces and protocols will be modified, while new systems may include this technology in their design and manufacture.

Throughout the years, the sciences of communications and computer engineering have evolved along differing corridors, only occasionally crossing paths in order to solve specific problems. Although convergence of the two disciplines has increasingly occurred over the last ten to twenty years, both sciences can still benefit greatly from observing how the other has addressed issues which have long been related to its' sphere of operations. Therefore this invention addresses the aforementioned problems by borrowing from both disciplines, in addition to that of nature.

The invention is patterned after the human brain and nervous system at the network level, with solid state representation at the neuron tier upward for highly distributed storage of data via solid state "memory units" that may number in the millions depending upon individual system design. Supervising software and protocols manage data storage and transmission characteristics; and the process utilizes an intelligent backbone employing high speed connections, ideally using optical fiber where possible.

Aside from the massively parallel pathways employed by the process, one of the main aspects which sets this process apart from other systems is the manner in which it manipulates and stores data. Data is striped across each nonvolatile memory unit, which in turn has its own data pathway allowing it to be written to and read from individually. This is of particular significance because of the number of solid state memory units which may be ultimately employed with the aid of solid state MSI, LSI and VLSI miniaturization as they relate to integrated circuitry (ICs).

Like the neurons in the brain, the integrated circuits with nonvolatile memory function in unison under the direction of a management section; in the computer industry this could be compared to a type of "super RAID controller" because of the amount of memory units it controls. The management section is divided into protocols and a software module, these interface with both the networks' Network Operating Software (NOS), and the inventions' hardware for nearly transparent interface and operation.

For the modification of existing systems, and in order to keep the large number of pathways manageable, time division multiplexing, wave division multiplexing and finally dense wave division multiplexing are employed at the computer level, by means of a apparatus called an enhanced personal storage device (E-PSD). The E-PSD consists of a special solid state memory unit and a network interface card which are both internal to the computer.

The section which comprises the network interface card is IEEE 802.3 compliant and has a SONET OC-768 connection, which in turn may be connected to a larger unit called a personal storage device (PSD). Due to its larger size and correspondingly greater ability to provide more memory units and data pathways, the PSD is designed to provide still greater memory for its host computer and bandwidth to the network, further reducing network congestion.

Where there exists an intermediary between the server and the node, as in a WAN, whether the intermediary is a telephone company central office or a CATV super hub, the invention provides for the unobstructed handling of massively parallel data by means of modified routers. Where the intermediary provides direct connection to the subscriber or receiving node, the invention provides for interfacing the data feed to the service providers broadcast/transmission equipment for distribution and parallel transmission to the subscribers terminal which is in turn designed to receive parallel transmissions. Whether the receiving node is a CATV set-top box, computer terminal or wireless phone, the procedure is the same.

In the case of a CATV or satellite set-top receiver, the process provides for the secure transmission and use of the data (in this case movies). The receiver contains the elements of a small computer with sufficient nonvolatile memory to store several movies. Hence the entire process embodied by the invention will permit subscribers to perform a data-on-demand download in the same manner as when one purchases software or other data via the Internet.

One key advantage of this technology is that management software can be loaded into the subscribers terminal which will interact with supervisory software contained on the program providers server. The management software will provide several services including file management of movie, music, music video, video/PC games, in addition to overseeing sales and rentals.

In this process, movie rentals (for example) may be downloaded from the program providers movie library at the subscribers leisure for a specified period of time, or number of viewing; during which the subscriber will be unable to illegally copy or otherwise transfer the data file.

When the specified period is over the data file is erased, the supervisory program on the program providers server verifies the process and alerts technical personal when a problem is detected and may be programmed to take appropriate action such as issuing movie credits, erasing movies, blocking service, or issuing email to name a few of the possible options.

DETAILED DESCRIPTION OF THE PREFERRED EMBODIMENTS

Hereinafter, an embodiment of the present invention will be described with references to FIG. 1 thru FIG. 22.

The invention is a process and apparatus for high speed data transfer for LANs and WANs which mimics the human brain and nervous system by utilization of highly distributed data storage, and massively parallel data transfer and reception over multiple channels/pathways resulting in enhanced bandwidth when compared to serial transmission.

The process and apparatus are modular in that the subsystems may be combined to function as one system (as in data-on-demand applications) or utilized individually, the six major sections are as follows:
1. Multichannel Parallel Communications Technology (MPACT)
2. Customer Authorization Technology (MPACT adjunct for Video-on-Demand Systems)
3. Multipoint Parallel Server (MPAS)
4. Multipoint Parallel Server Generation 2 (MPAS-2)
5. Multipoint Parallel Server Generation 3 (MPAS-3)
6. Parallel Transfer Application Software (MPACT Adjunct)

Multichannel Parallel Communications Technology (MPACT)

Figure 4:
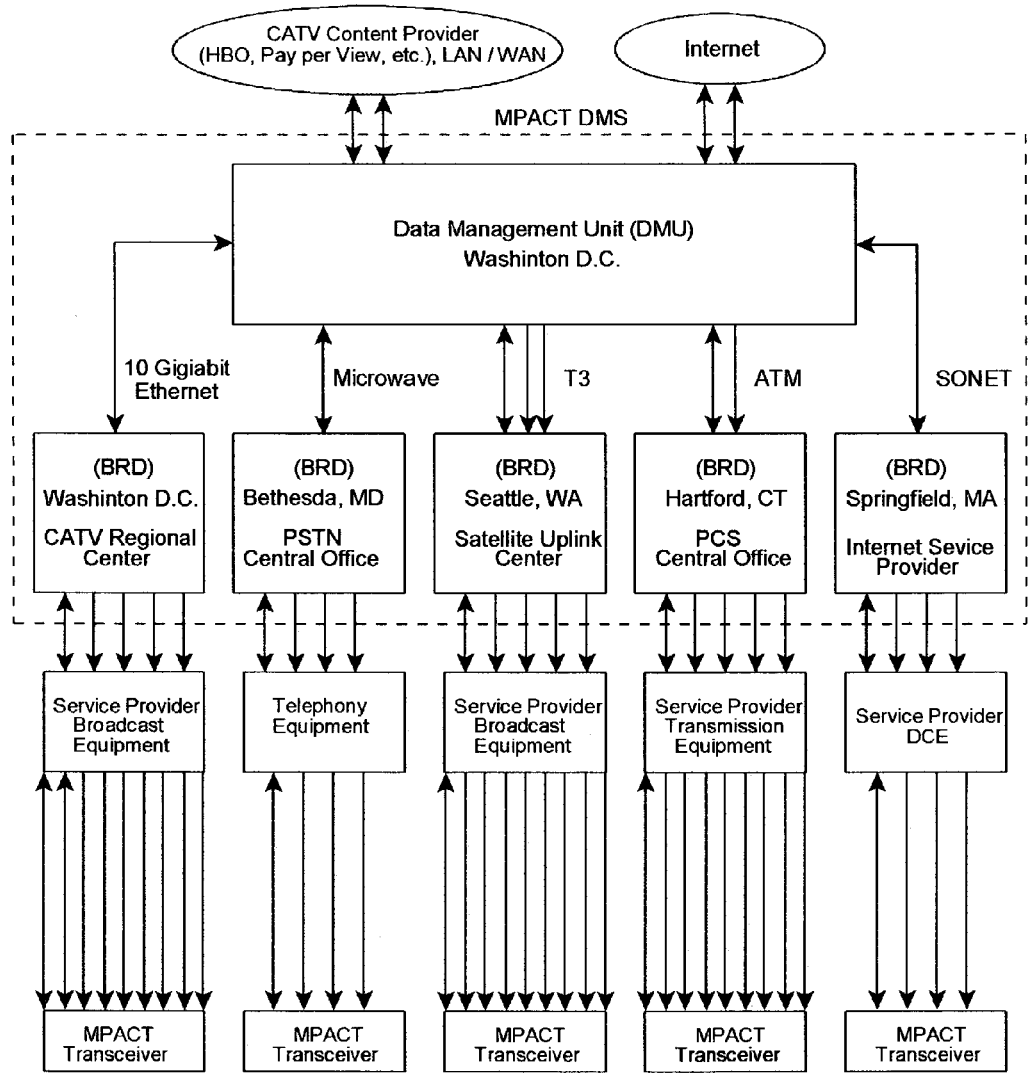
FIG. 4—illustrates data transfer utilizing MPACT and MPAS.
Figure 18:
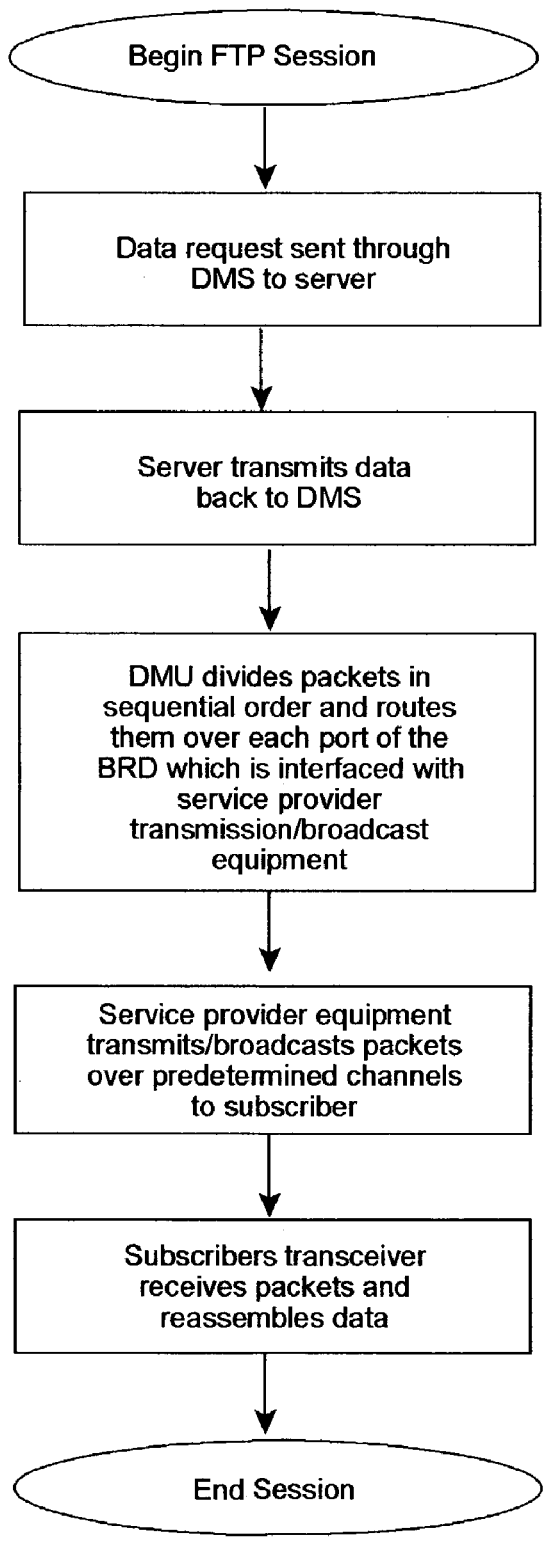
FIG. 18—is a flow chart illustrating the primary stages required in the MPACT process.

The portion of the process which works with communications networks which utilize multiple transmission paths or channels is called "Multichannel Parallel Communications Technology" or MPACT. The types of facilities and networks with which this technology can be interfaced with includes but is not limited to: telephone company central offices, cable television super-hubs, and satellite television uplink centers (FIG. 4, FIG. 18).

MPACT is a process and apparatus for high speed data transmission/broadcast and reception, via equipment capable of parallel data transfer and reception over multiple channels and/or frequencies in parallel. This process and apparatus may be utilized with digital, analog and analog-digital hybrid systems. In addition to traditional data transfer and telephony applications, this technology will enable service providers to utilize true data-on-demand features such as video-on-demand with realtime online video rental and sales capabilities.

The "M" in MPACT applies to multichannel, multifrequency and multiple path equally. Hence, MPACT provides for the large scale to very large scale parallel transmission and reception of data over satellite, cable, terrestrial, and/or other mediums.

Figure 1:
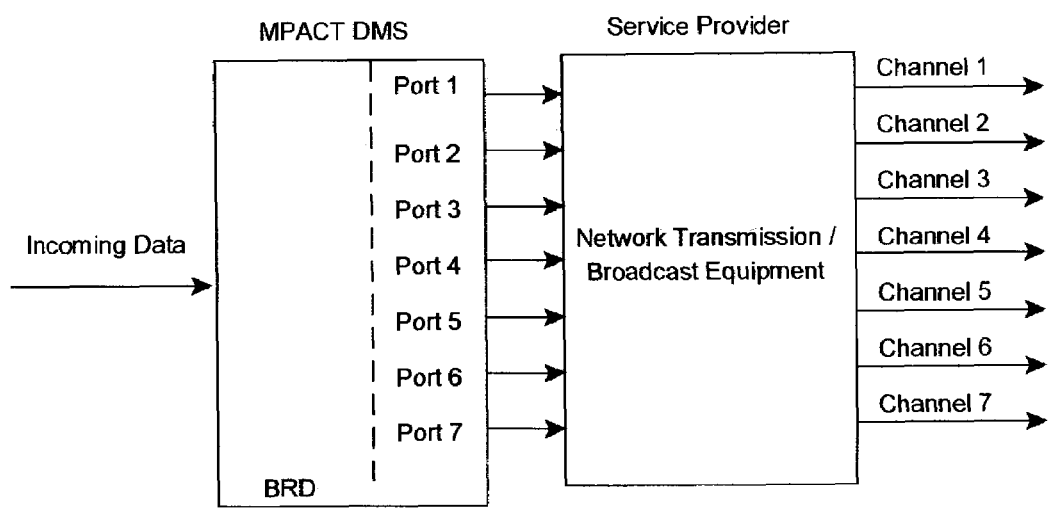
FIG. 1—is a depiction of the MPACT DMS and its relationship to the service providers transmission I broadcast equipment.

The components which make up MPACT are: the Data Management Section (DMS) which is the parent unit which encompasses the Data Management Unit (DMU) and the Broadcast Routing Device (BRD). What sets this system apart from conventional routing devices is that it is designed for interface with the multichannel broadcasting or transmission equipment owned by a service provider. The DMS takes incoming packets and evenly distributes them over a specified number of channels for parallel broadcast or transmission over the service providers equipment, hence if a cable television network provides one hundred channels to its subscribers, it may choose to utilize some or all of these channels for parallel transmission (FIG. 1).

Figure 2:
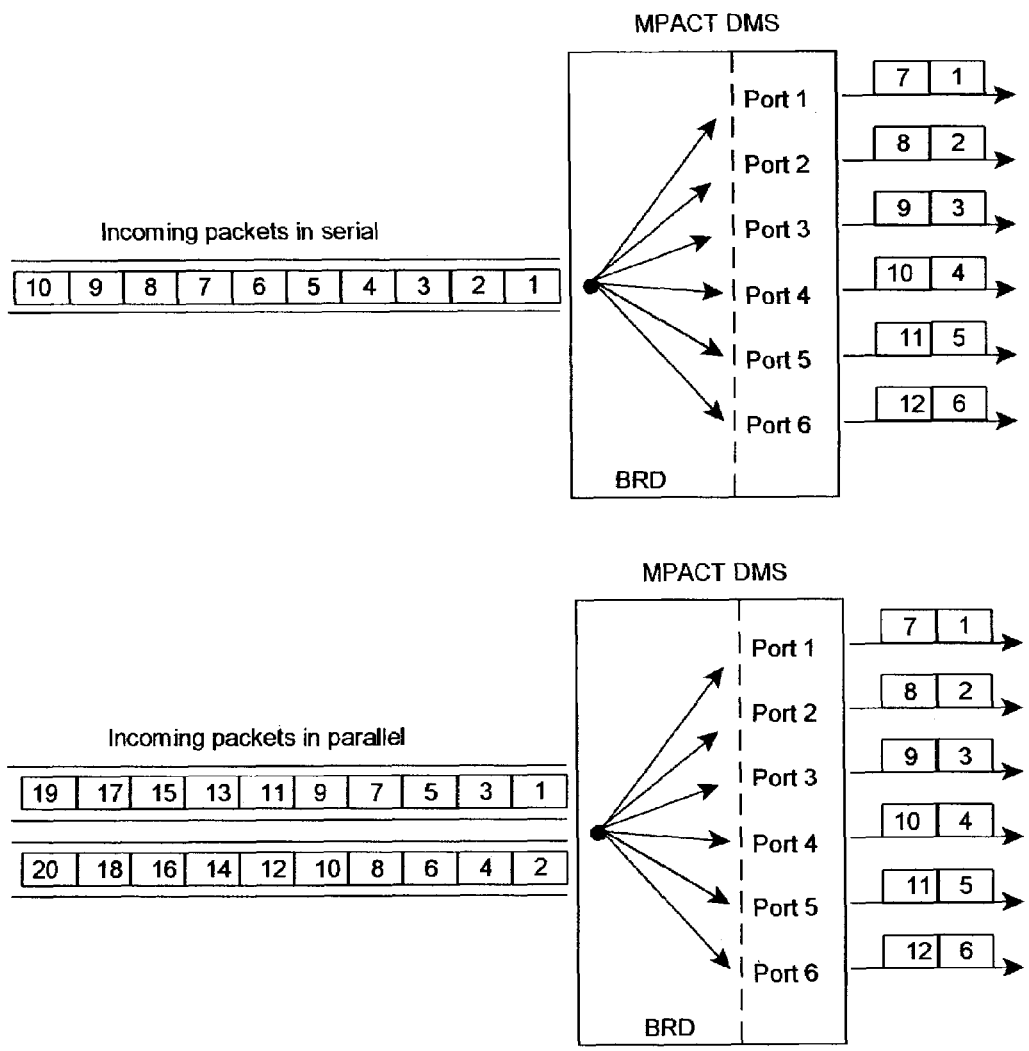
FIG. 2—depicts the DMS manipulating incoming packets for parallel transmission.

The Data Management Unit (DMU) will consist of a computer with appropriate software, I/O ports, and interfaces. As its name implies, this system performs administrative functions in connection with the Broadcast Routing Device, and has both serial and parallel routing capabilities for compatibility with present systems (FIG. 2). Under normal circumstances it lessens processing demands on the BRD by assuming those tasks which are unique to parallel packet routing (as mentioned in the preceding paragraph) and assists in high traffic applications such as data centers, Internet Service Providers (ISPs), telephone company central offices and the like.

Figure 3:
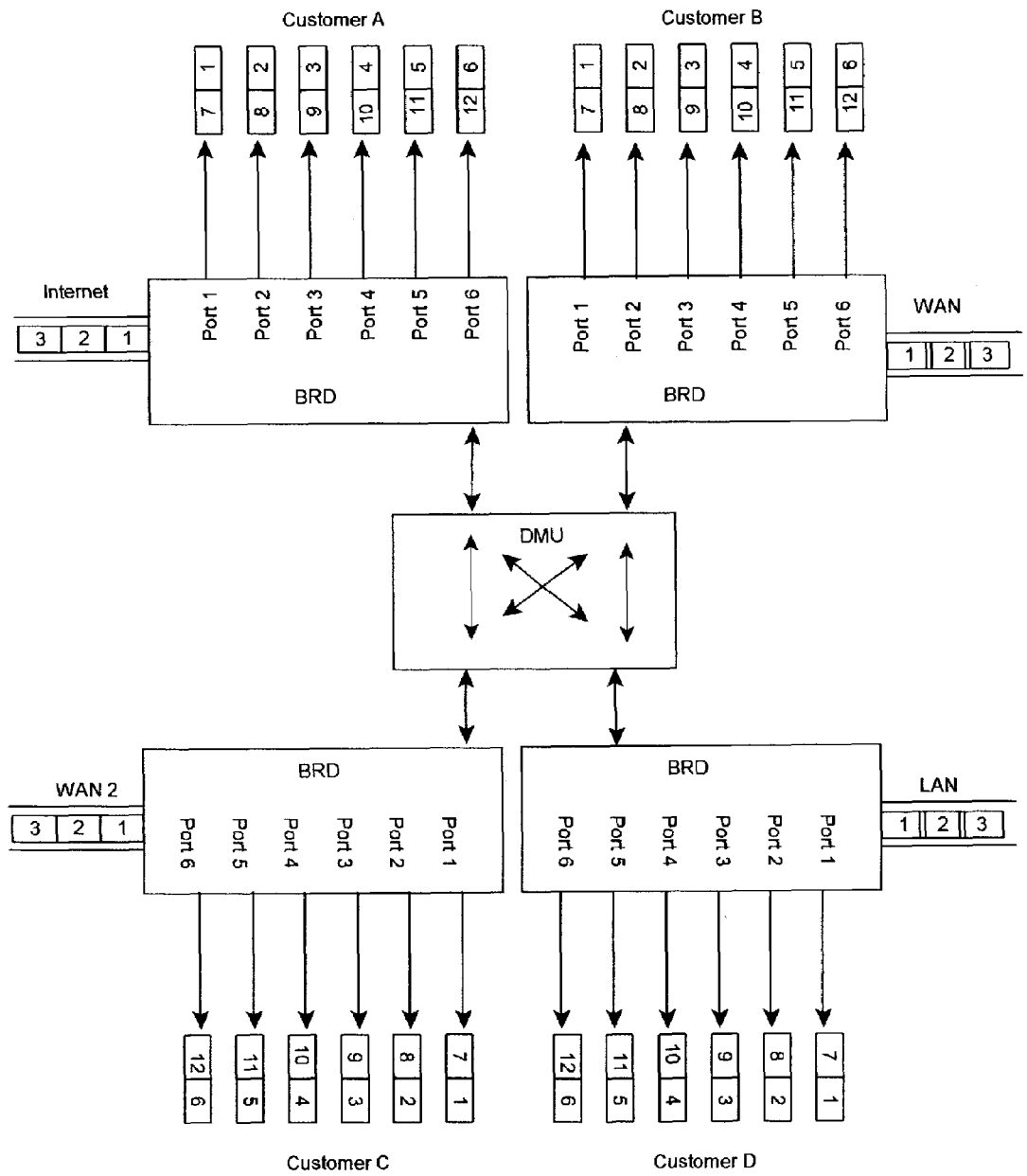
FIG. 3—shows the DMU performing as an element manager.

With respect to high traffic applications, the system is scalable, and may also serve as an element management system (EMS) in that it can manage the bandwidth allocation of additional BRDs, run diagnostics, configure reports, serve as a terminal where manual routing adjustments may be implemented, utilize parallel transport protocols (pFTP, pTCP/IP) and/or software compatible with parallel data transfer (FIG. 3).

The Broadcast Routing Device (BRD) is a scalable programmable router (or an addressable device capable of performing similar functions) which may be hardware and/or software in design. The size, capacity and complexity of this unit may vary from one suitable for residential/SOHO use; to a carrier grade, high speed router/switch. When coupled with the DMU, this unit functions as an addressable, intelligent, high capacity multi-port apparatus for parallel packet transmissions. The number of ports will be configured to meet the needs of the individual broadcaster, ISP, wireless service provider, WAN, etc.

FIG. 4 depicts an instance in which one DMU may manage the bandwidth of several BRDs. In this illustration, a telephone company in Washington D.C. provides high speed connections to the Internet and a Pay-Per-View service. The phone company's DMU provides both high speed serial and parallel data connections down stream to its network customers. Each service providers' BRD is interfaced to their broadcast/transmission equipment. Therefore when each service providers' BRD receives data packets, they in turn route them in parallel over predetermined ports to the broadcast/transmission equipment, which then sends the packets over a predetermined number of channels to its subscribers.

As shown in the illustration, the service provider may permit the subscriber to transmit data upstream either in serial or parallel by way of transceivers which are modified to work with their particular network.

Additional examples of this inventions flexibility may be found in connection with satellite systems, for several approaches may be utilized once the DMS is interfaced with the service providers' broadcast/transmission equipment. For DVB satellite systems, a digital broadcast in parallel may be accomplished by transmitting a data file in parallel over multiple transponders, or the packets may be evenly transmitted over the various channels allocated to each transponder.

With respect to an analog satellite TV system, broadcasting in parallel may be accomplished by evenly transmitting the packets over multiple frequencies, or channels in the case of analog-digital hybrids. Hence, any combination of multiple satellites, transponders, frequencies, and/or channels may be used.

Transceivers

Figure 5:
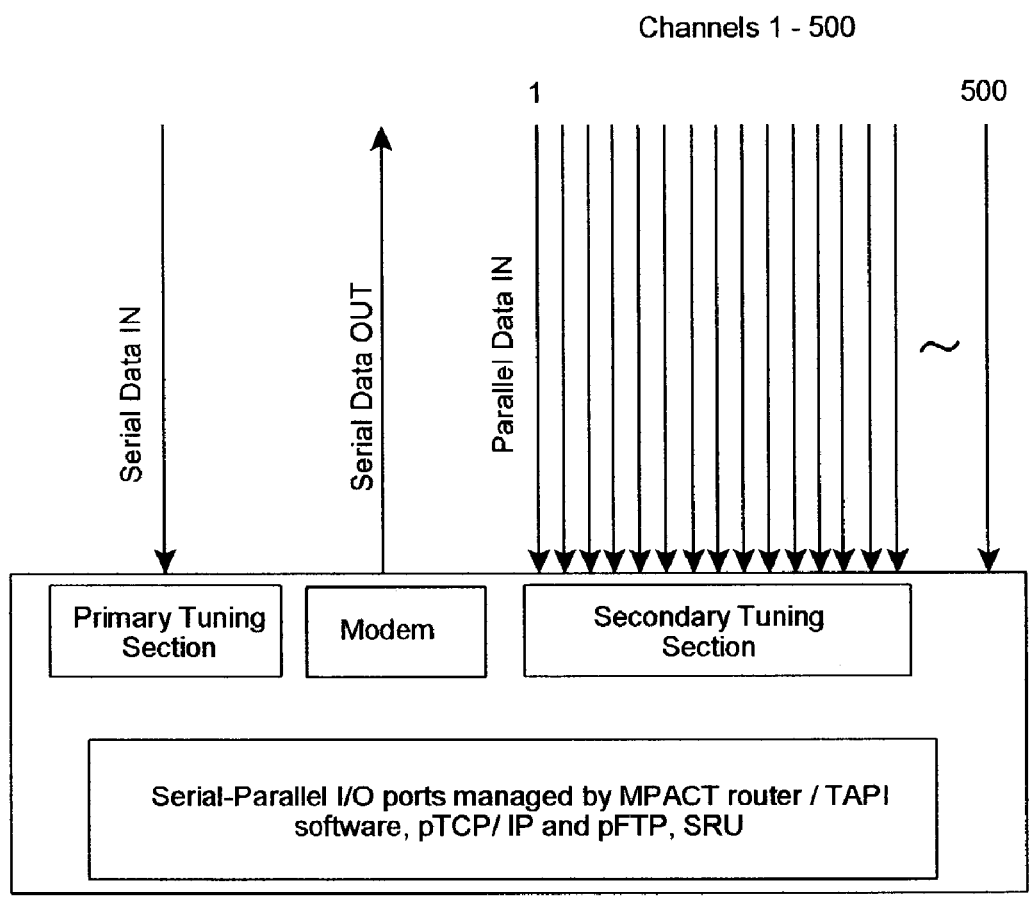
FIG. 5—is a class "A" transceiver.
Figure 6:
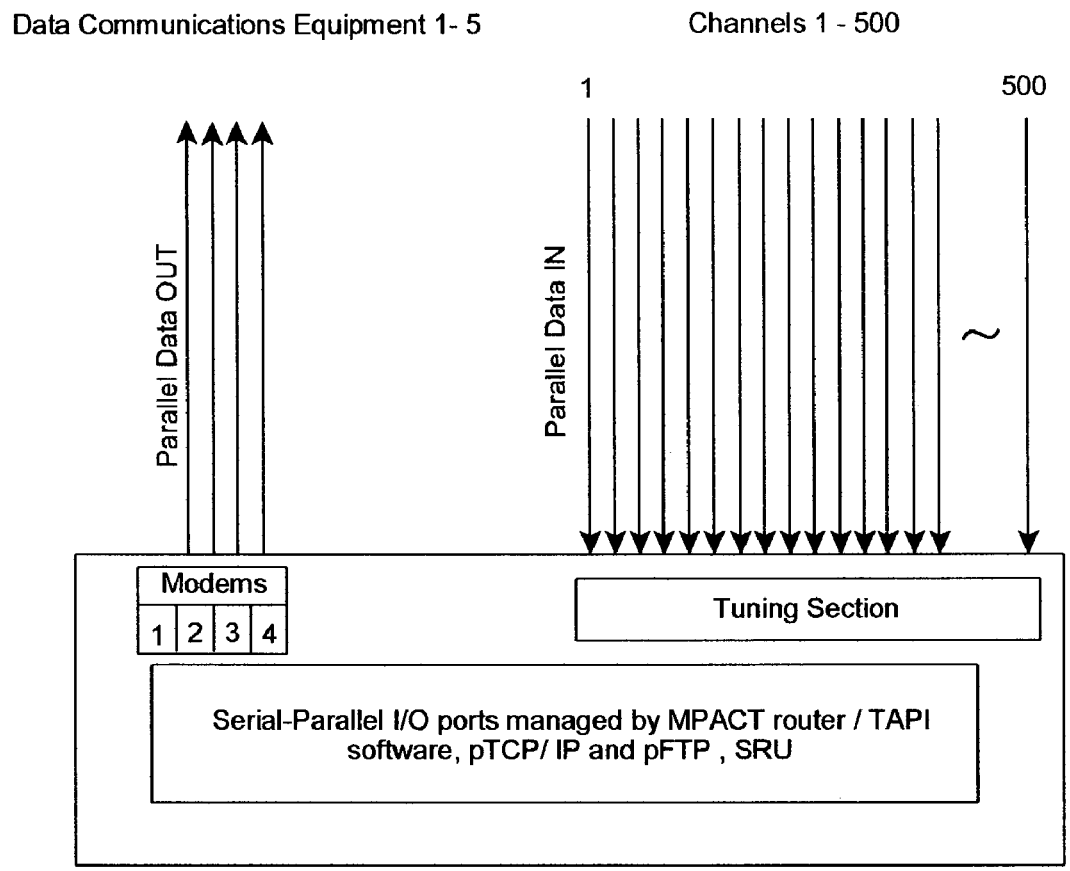
FIG. 6—exemplifies a class "B" transceiver.

As illustrated in FIG. 4, 5 and 6, subscribers will be supplied with specialized receivers (hereafter referred to as transceivers) which will have data upload capabilities due to one or more DCE devices (modems, cable modems, satellite transmitters, etc.). An internal router, CPU, bus, ports, and a network interface will enable data transfer to the internal memory, and/or any external device(s) or network(s). In order to facilitate parallel upload and download capabilities, an MPAS Systems Resources Unit (SRU) and or protocol will be employed, this process and apparatus is discussed in more detail later.

The transceivers are addressed as network nodes in the same manner as interactive CATV and satellite TV set top boxes, computers, and all other devices using TCP/IP protocol and/or other data addressing and management systems. In addition, receivers and transceivers which utilize this technology may also be equipped with telephony via Voice Over IP (VoIP) technology, along with a special customer authorization technology which will enable service providers to utilize Data-on Demand features such as Video-on-Demand.

It should be noted that where the terms modem/cable modem are used, it is understood that demodulator is the most accurate designation for large scale channel reception, since modulators are not utilized by the transceiver in the same manner as with a traditional modem device. However, for very large scale reception with associated bandwidth, tuners currently prove to be the most practical device.

Hence Two Classes of Transceivers may be Employed:

Class "A" transceivers will utilize the parallel transmission and reception process /circuitry, in addition to circuitry used in receivers which are not parallel in nature such as contained in traditional CATV set top boxes, satellite TV transceivers, pagers, wireless Internet apparatus, etc., FIG. 5 illustrates an example of one Class "A" transceiver configuration. In these instances, the primary tuning section will provide access to traditional program reception, and the secondary tuning section will provide access to parallel data transfer.

Class "B" transceivers are stand alone units, in that they do not operate alongside nonparallel receivers, transmitters, or transceivers. They are used for the same overall applications as typical Data Communications Equipment (DCE), i.e., modems, CSU/DSUs, cable modems, etc., FIG. 6 illustrates an example of one Class "B" transceiver configuration.

Figure 7:
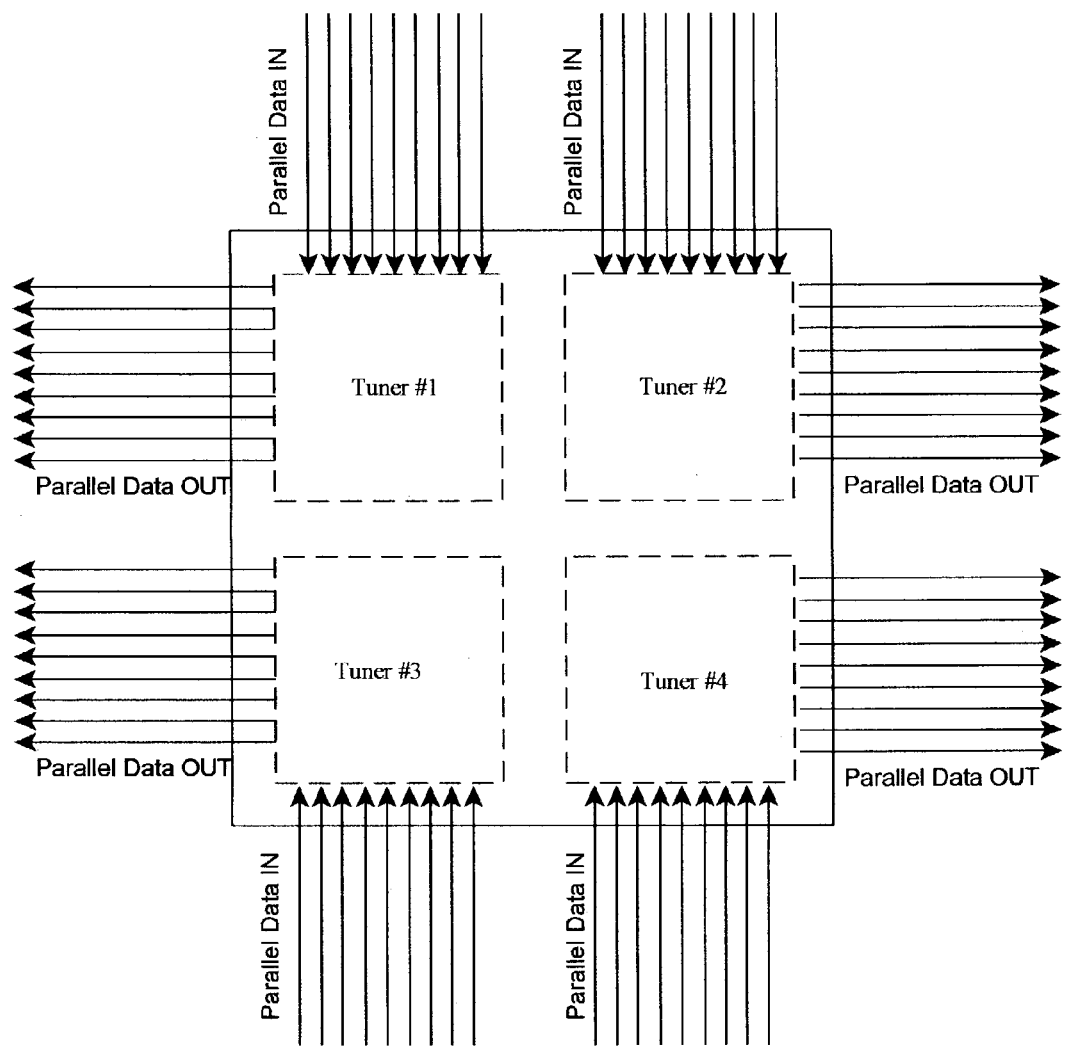
FIG. 7—is a integrated circuit (IC) containing four solid state tuners.

For relatively low bandwidth applications (such as residential, SOHO use), multiple solid state tuners can be incorporated into a single integrated circuit (IC) /package, hence reducing manufacturing costs and enabling more efficient space utilization (FIG. 7).

Tuner Switching

Where 1:1 tuner/channel interfacing ("always on" data reception) is cost prohibitive or otherwise impractical for parallel data reception, the unit may employ high speed channel switching (or sampling) which operates in the following manner (note that the parallel section is designed for movie/ data downloads which require high bandwidth, traditional CATV or satellite program reception is handled by traditional tuner circuitry):

Where solid state tuners are utilized, each tuner is connected to a switching circuit which assigns a range of channels per tuner and causes the tuner to change channels with each CPU clock pulse, thus allowing each channel the opportunity to receive downstream data. Furthermore, this circuit may be designed to engage on both "on" and "off" phases of the pulse by employing a solid state inverter on the negative pulse phase, thereby doubling the switch speed. The CPU clock pulse may be local to the transceiver, the parallel circuitry itself, or a central pulse may be received from the service provider over a set-aside channel (notice that in example 1-FIG. 8, channel 105 is vacant).

Hence, if a transceiver has an 800 MHz CPU, a secondary tuner section with four tuners, on a CATV network with 100 channels; a twenty-five channel range may be assigned to each tuner; resulting in a per channel switch rate of 32 million times per second (800 MHz ÷25 channels) and an overall transceiver switch rate of 3.2 Ghz (32 MHz ×100 channels), which may be doubled to 6.4 GHz by utilizing both phases of the clock pulse. This degree of channel switching will permit relatively high bandwidth on devices capable of parallel data reception, data transmission integrity is assured via TCP/IP, and a grounded shield may be optional for the high speed switch rate (FIG. 7).

Government/Medical/Enterprise Applications

For high bandwidth applications (such as government, medical, and enterprise use) the transceiver may be designed as follows: a receiver section of modular shelf design may be employed. Each circuit card will contain sufficient tuners to allow each channel to be interfaced with an "in" port. Each port is in turn interfaced to the central high speed router, and subsequently interfaced with the end user's network via a high bandwidth connection such as 10 Gigabit Ethernet (for example).

Hence the receiver section and the router function in the opposite manner of the DMS; providing end to end multichannel parallel broadcast/transmission and reception. Besides performing the aforementioned tasks, the routing software may serve in the same capacity as in the DMU, by manipulating data in such a manner, that outgoing data packets will be evenly distributing over the maximum number of outgoing ports, allowing data to be transmitted over multiple transmission devices, hence providing parallel transmission capabilities upstream (FIG. 6).

The following example provides a description of how the entire MPACT process and apparatus would function in one type of application.

EXAMPLE 1

Figure 8:
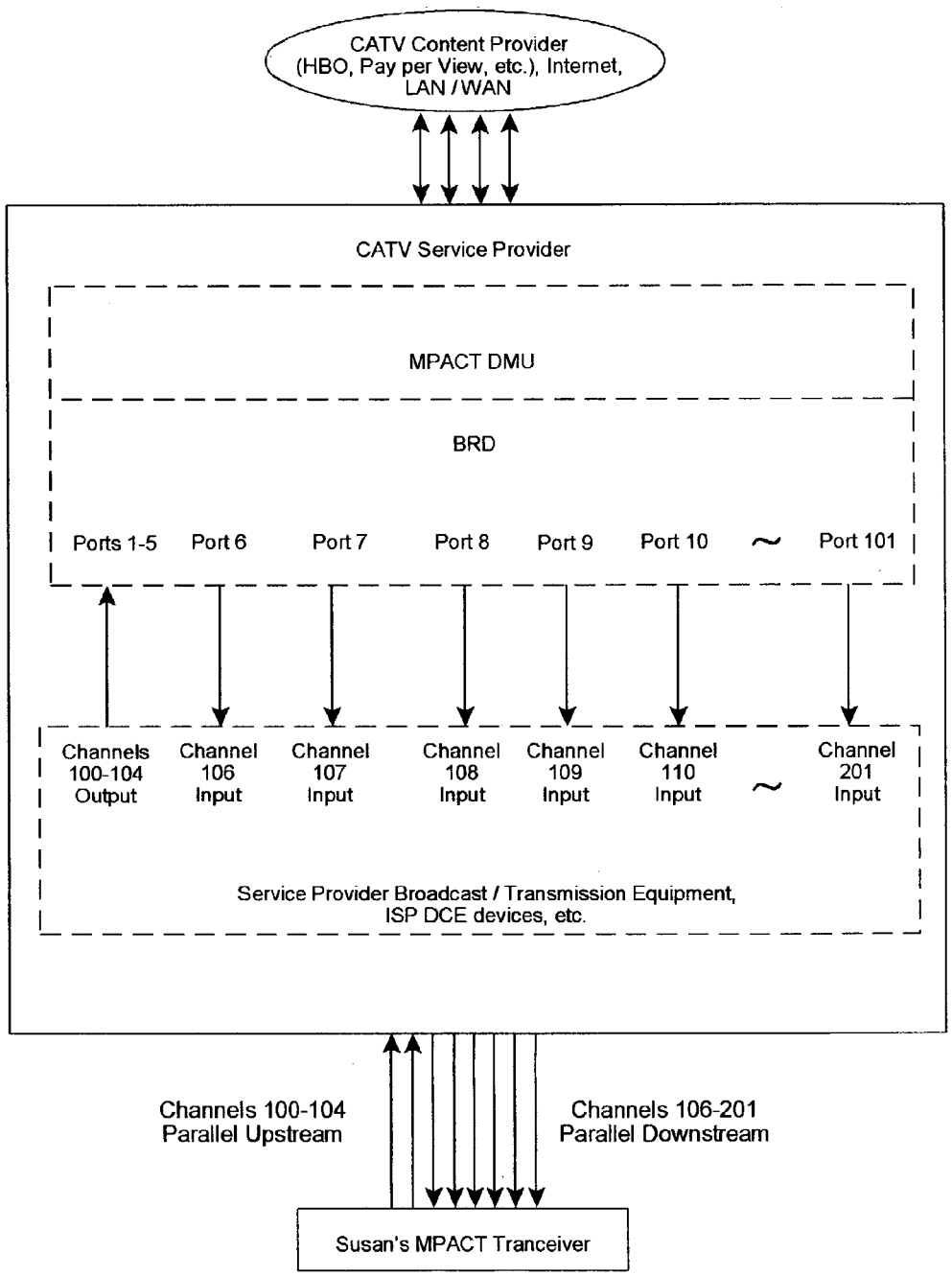
FIG. 8—illustrates the process of example number one.

FIG. 8 illustrates the following: An analog CATV service provider with a two-way cable system, and who offers one hundred-ten cable channels to its customers with traditional programming, may wish to also provide Internet service utilizing MPACT.

The service provider decides to "share" network resources by assigning five channels upstream from the consumer to the head end (channels 100-104), and ninety-five channels downstream from the head end to the consumer (channels 106-201). The service providers' head end equipment provides MPEG-2 transmissions at 2 Mb/s per channel, with a capability of 6 Mb/s per channel, at 6 MHz per channel. Hence the service provider multiplexes the upstream and downstream data with normal broadcasting (A/V) signals for each channel (an alternate method would be to provide separate channels for MPEG-2 transmission, and upstream/down stream data transfer).

The service provider obtains an OC-192 (9.95 Gb/s) connection to the Internet (with gateway), and interfaces this to the DMS. Ports 1-5 of the BRD are assigned "In" (upstream—consumer to head end) and ports 6-101 are assigned "Out" (downstream—head end to consumer).

Hence, 4 Mb/s per channel can be utilized equaling a total of 380 Mb/s downstream and 20 Mb/s upstream. The amount of bandwidth can be adjusted by varying the Internet connection speed, affecting the number of channels utilized, the amount of available bandwidth per channel, upgrading individual devices, interfaces and connections to those with higher bandwidth as one would in a typical internetwork.

When a cable television customer (we'll call her Susan) wishes to go either online, download a video or other data from the service provider, she may do so by way of a computer (which is connected to the transceiver via NIC card), by telephone (via customer service or voice automation), or by an interactive set-top transceiver which may or may not have a remote control or keyboard.

In this case Susan has an interactive set top box (parallel transceiver) equipped with five 2 Mb/s cable modems which are modified to transmit (modulate) only, and appropriate secondary tuners utilizing parallel transmission/reception protocols.

When Susan forwards a request, the data request packets are processed by TCP/IP and the transceivers' internal router which evenly distributes the packets to the five ports which are interfaced with internal cable modems (in this instance 64QAM modulators—this is adequate because HFC is the medium, and the upstream transmission is going to the service providers CMTS which is in turn interfaced via gateway to an OC-192 Internet connection). The modulators forward the packets over cable channels 100-104 upstream to demodulators at the head-end for further processing by the DMS which in this case functions as a cable modem termination system (CMTS) by routing data from many cable modem users over a multiplexed network interface (A modified CMTS may be utilized, provided it is designed for parallel transmission/reception thus functioning as a BRD.). The data is interfaced to ports 1-5 where it is routed to the appropriate address.

Should Susan wish to use the Internet, the packets will be routed from the BRD to one or more gateways as required by the service provider and then over the OC-192 connection(s). The SRU protocol will determine whether the intended end server is parallel compatible, if not the DMS will route all packets over a single channel for serial transmission.

Once the request is processed at the appropriate end server, the server sends the requested data back to the DMS which divides the packets among the ninety-five ports (Ports 6-101). Since the network has multiple paths back to Susan's transceiver, and each path has equal metric values and is managed by the DMU, the packets are transmitted in parallel.

Via interfaces to the service provider broadcast equipment (in this case 64/256 QAM modulators), the packets from BRD ports 6-101 are then broadcast over cable channels 106-201 with port six interfacing with channel 106, port seven interfacing with channel 107, etc.

The transceivers' secondary tuners which are tuned to channels 106-201 receive the packets, and the data is forwarded to the internal router, which then sends the data to its final destination for file reassembly, be it a local hard drive, a remote hard drive, computer network, PDA; pager, PCS device, etc. In this case the destination is the hard drive located within Susan's interactive CATV set-top box. Software within the set-top box permits her to view the video on the specified device (television, personal computer, etc.).

Telephony

MPACT appliances equipped with sufficient nonvolatile memory, cache, internal bus architecture, and appropriate software may include IP Telephony, Email and Fax among its applications, with additional I/O ports and NIC card optional.

Figure 9:
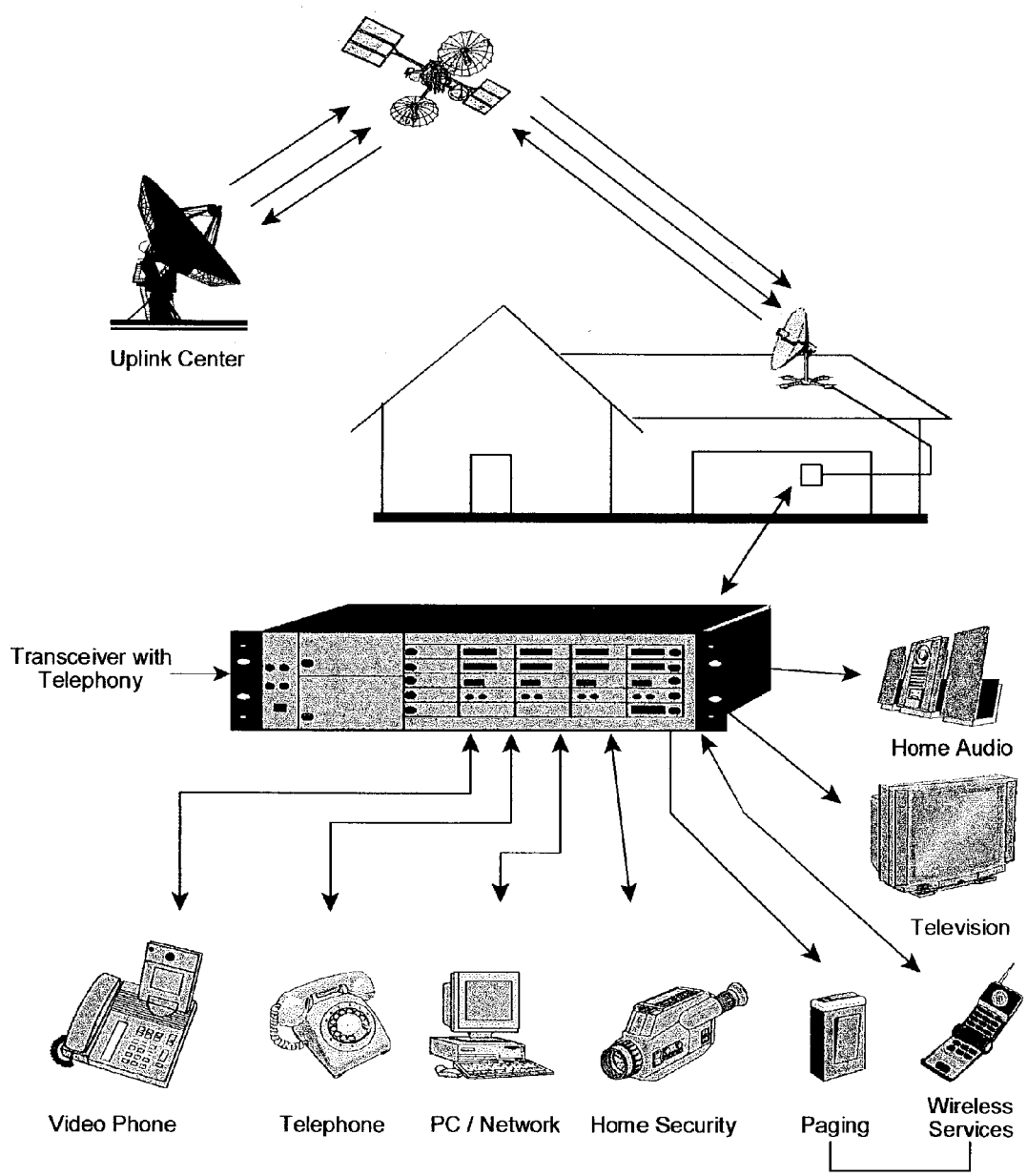
FIG. 9—shows how an MPACT transceiver can also serve as a communications hub.

Additionally, special MPACT based communications terminals may be designed to function in a manner similar to a traditional telephone company line distribution terminal with lightning/surge protection (the type commonly located at the customer's premises, on the side of the house or in the basement) as depicted in FIG. 9.

Like the traditional terminal, the specialized terminal would provide lightning/surge protection and line distribution; however, the terminal would also function as a combination computer network hub and router, allowing for twisted pair, coaxial, and/or fiberoptic connections.

Hence, this terminal would serve as a distribution point for the routing of all incoming an outgoing telephony/data signals to the appropriate recipient; whether it is a local IP telephone, computer, video camera, CATV/satellite set-top receiver, or a device located in a distant land to which the consumer has authorization. Allowing for high speed communications with more flexibility than traditional home/office communications systems, home automation, and more efficient home security monitoring.

Consumer Authorization Technology

Due to software located in both the content provider's computer server and in the nonvolatile memory of a transceiver (hereafter known as the primary transceiver, which could be any Internet device which employs this authorization technology), the content provider will have the ability to sell videos, music, computer programs, and other data in the same manner as one would do over the Internet, with the added ability to rent the same as selected by the consumer.

By Means of this Computer Program, and RF Transmitter/Receiver Units Located:
  Within the primary transceiver
  Contained within special audio/visual cables supplied by the manufacturer and attached to the user's transceiver, PC/server etc.
  Or built into recording units (customer provided equipment—CPE) built by various licensed manufactures The consumer will be unable to record the downloaded video/music unless authorized as in the case of a purchase; and will be unable to utilize the data beyond a certain time frame in the case of a rental.

Data will be purchased or rented for a number of days via an Internet/Intranet online type transaction, the content provider's computer server will formulate a digital stamp based upon whether the transaction was a purchase or a rental, the type of data (e.g., music, movie, music video, computer game, computer program, or text file), and the primary receiver's IP/DNS or other type address, and the date/time of order.

The stamp is then attached to the downloaded data, in so doing the server sends a copy of the digital stamp to a database residing in the primary transceiver's internal nonvolatile memory. The management program in the transceivers' nonvolatile memory will check the folder prior to each time the data is played/accessed.

If the transaction is for a rental or demonstration, the server will include the number of hours for which the data will remain in the primary transceiver's nonvolatile memory before the primary transceiver's management program deletes it. Additionally, the programming within the primary transceiver will activate an RF transmitter contained therein.

Cables

Figure 13:
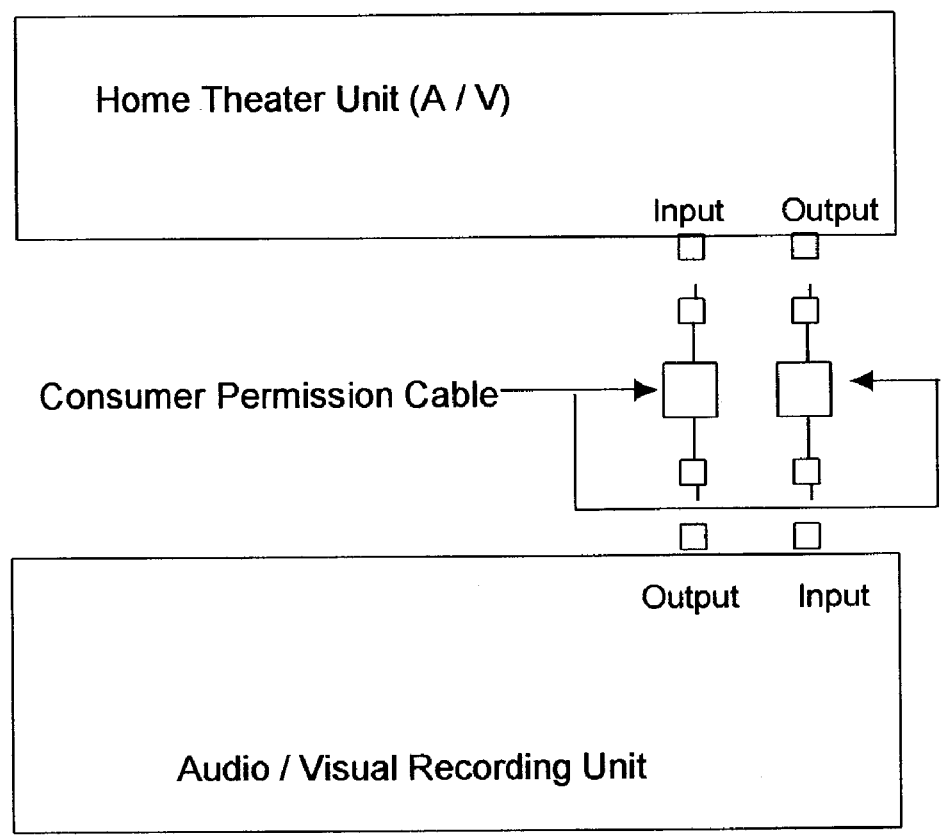
FIG. 13—depicts the placement of audio I video cable associated with customer authorization technology.
Figure 14:
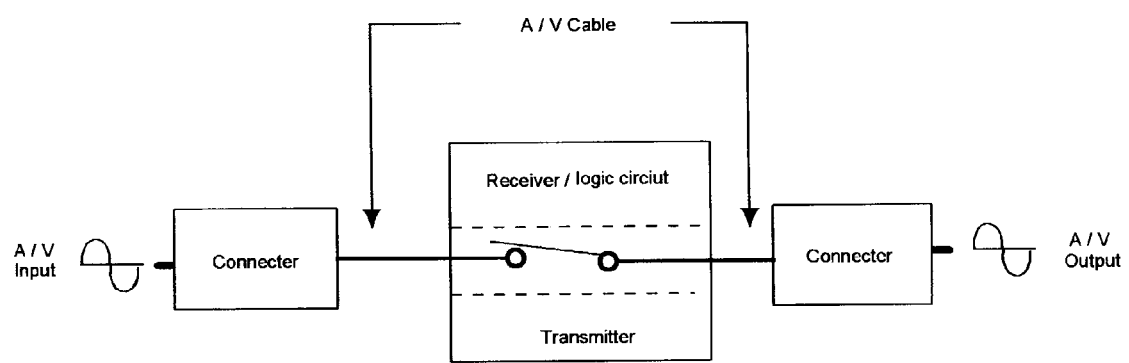
FIG. 14—depicts the basic principles upon which the security cables function.

Special audio-video cables will be supplied with the primary transceiver, each of these cables will contain a low voltage solid state switch and transmitter/receiver which will communicate with the primary transceiver. These cables may receive power from the primary transceiver or home theater/stereo input/output terminals to which they will be connected (FIG. 13 & FIG. 14).

When the subscriber receives the primary transceiver, they will be required to attach the supplied audio-video cables onto their existing cables or onto the input/output terminals of the audio/visual system. Each of the supplied cables will have prominent markings to differentiate them from the other cables. The cables will be compatible with RCA and RG6 connectors. One of the supplied cables will have a special connector which will attach to the transceiver. The other side will attach to the user's television, home theater system, VCR, or other audio/video device.

During setup, the user will be instructed to enter information about his/her audio-visual system into the transceiver's database. While doing so the user will be instructed to indicate which of the supplied cables are attached to the input terminals on each recording device.

Near the end of the setup process, the primary transceiver will download network program information such as electronic program guides, special notices, software updates, video/data on demand credit(s) which may be issued by the program and/or service provider(s), etc. This process may be repeated whenever the consumer depresses the "setup" button on the primary transceiver, remote control or key board.

When the primary transceiver's RF transmitter is activated because a downloaded rental or demonstration data file is about to be played/utilized, the receiver inside the audio-video cables picks up the signal and causes the solid state switch contained therein to open therefore preventing the user's audio-video equipment from recording the data.

The transmitter will transmit an open and close frequency for each of the specialized cables. Since the user has supplied cable placement information in the transceiver database, and the program/service provider's server has indicated the type of data file which has been downloaded into the transceivers' nonvolatile memory; the management program will issue a command to open the cable to the input terminal of the device which the user may most likely attempt to record with.

Once set up is complete, should the customer disconnect the input cable of any recordable device the transmitter inside the cable will alert the transceiver, this will be accomplished by a second set of frequencies which the transceiver and the cables will use for handshaking. The handshaking between the transceiver and each of the cables on the A/V recording inputs may take place either continuously or at regular intervals; hence if the signal is interrupted, the transceiver may delete all files associated with that type of audio-visual equipment, prevent the user from downloading that type of file, issue an error signal to the transceiver's technical service personnel (via the transceiver's cable modem or other DCE) who may issue an email or place a phone call stating that they have noticed a problem with the user's service and offer assistance. After the cable is reconnected to the associated equipment input, the service technician can reinitiate the users' download privileges, and issue credits where appropriate.

Customer Provided Equipment (CPE)

Figure 15:
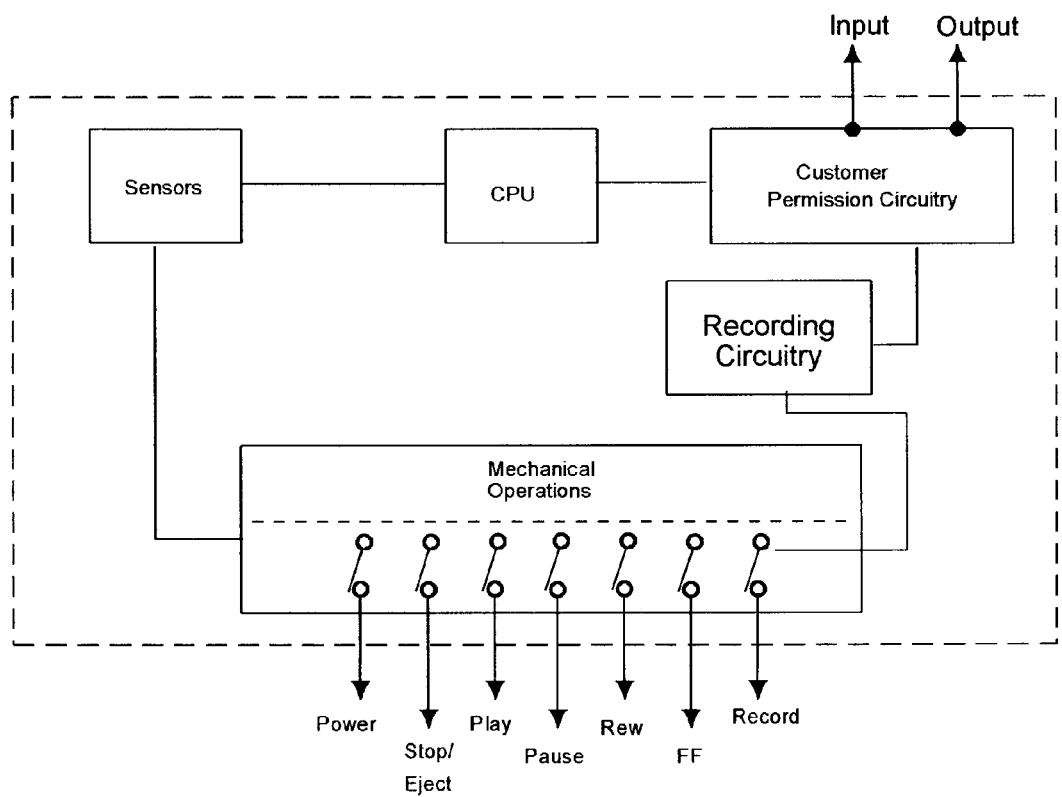
FIG. 15—shows one example of how manufacturers can design customer authorization technology into audio/video recordable devices.
Figure 16:
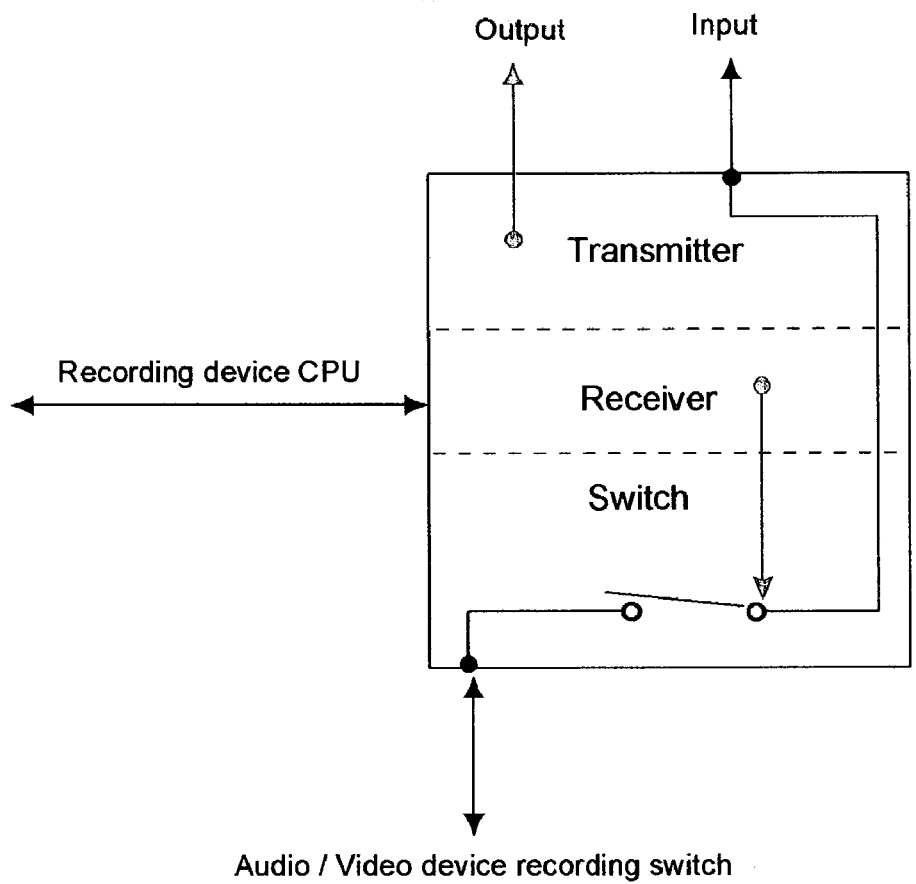
FIG. 16—provides another rendition of the elements which make up the customer authorization technology transmitter.

Licensed manufacturers may install customer authorization technology into recordable devices such as VCRs, recordable DVDs, Internet appliances, etc. This may be accomplished by installing an internal RF transceiver within the recordable device which is compatible with the primary transceiver. A switch will be connected to the RF receiver on one side, and to a location within the recorders' circuitry which will interrupt the users' ability to record when they depress the record button located on the unit, or remote control (should there be one), if they are not authorized to record the data (FIG. 15 & FIG. 16).

The switch may be normally closed to allow for traditional use and for the recording of authorized data via the primary transceiver, and opened when viewing rented material/ unauthorized data. This type of authorization would be primarily employed for data contained within the primary transceiver's nonvolatile memory - downloaded data (FIG. 15 & FIG. 16).

For authorization of prerecorded data, media companies (video/music/software, etc.) may utilize standardized data authorization code(s) which could be inserted into the media (video/music recordings, software, etc.) and which could be read by the appropriate apparatus of various recording devices equipped with customer authorization technology.

The recordable CPE device with authorization technology will utilize a register/database which will contain an authorization key. When media is loaded into the CPE, the device will operate in normal fashion, however when the device detects the authorization key the device will disable the recording circuitry located therein. This type of authorization would be primarily employed for media hard copies (CDs, CD-ROMs, DVDs, Video tape, etc.) which would be sold primarily via traditional/non-online distribution/marketing. The purpose of this last process is to prevent systems equipped with customer authorization technology from being used for unlawful purposes.

Multipoint Parallel Server (MPAS)

MPAS-2 and 3 are descendants of MPAS technology, as such, they inherit a number of familial traits. Hence a brief discussion of MPAS concepts is furnished in order to provide a foundation for the discussion of these two technologies which are successive miniaturizations of this technology.

Because this portion of the invention relates to data storage, and the read/write capabilities of memory units as related to their specialized architecture and associated bus structures; it follows that while MPACT was heavily related to the data transmission/broadcast systems of Service Providers, MPAS is heavily related to the computer servers and LANs of Program Providers and other users.

The speed at which computer networks can supply very large data files, has lagged behind the speed in which broadband mediums can carry data considerably, if not addressed this would cause a problem/bottleneck with respect to the previously described MPACT portion of this invention. Hence, in order to assist in the lessening or (elimination) of this, MPAS or a distributed network—high-end RAID storage system may be employed.

The overall speed at which a data file can be transmitted may be enhanced by a factor of n (where n represents the number of file segments, in a segment to transmission channel ratio; where the number of channels are equal to or greater than the number of data file segments), provided that additional networks simultaneously download separate parts of the same file on separate paths in parallel.

This process is useful in high traffic applications where large files are accessed such as medical files or video-on-demand systems where videos are downloaded over a Intranet, virtual network, the Internet, CATV networks, satellite systems, etc.

MPAS employs a modified distributed network which differs from traditional distributed networks in that it:
1. Functions as a multi-server parallel RAID network—multiple high end RAID networks supplying data files in parallel as one unit.
2. Is optimized for MPACT compatibility 3. The SRU (discussed more detail later) is a dynamic system which permits each RAID subsystem, RAID bank, and/or multiple banks of RAIDs to be treated as a single node in an internetwork, hence, the SRU may function as a specialized server in smaller applications, and as an element management system (EMS) in larger applications. With automatic file/file segment, resource, and connection monitoring/routing updates, "hot swaps" are permissible.

The process is similar to a number of RAID configurations which utilize data striping, a procedure in which data files are divided and written to several disks. This technique allows the processor to read or write data faster than a single disk could accept or supply.

Furthermore MPAS provides additional speed by linking multiple computers/networks together and providing multiple transmission paths (usually highspeed—Gigabit Ethernet, ATM etc.) for each network to the recipient which may be an MPACT—DMS or other device capable of receiving parallel transmissions and converting the packets for parallel/massively parallel transmission/broadcast.

Figure 20:
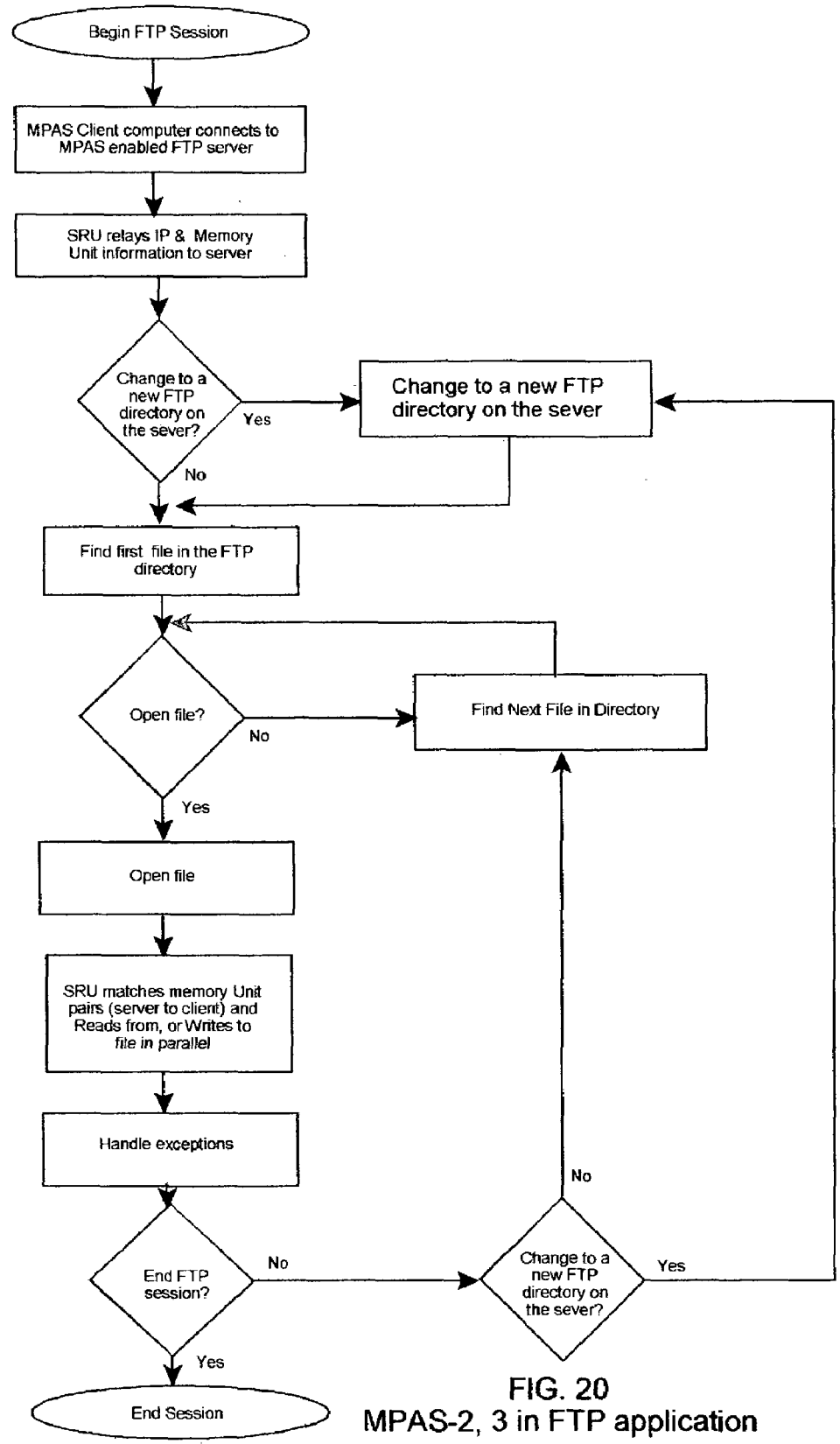
FIG. 20—is a flow chart illustrating the primary stages required in MPAS -2 & 3.

Enhanced bandwidth is especially apparent when multiple networks are utilized where each network has multiple processors, RAID systems (or an equivalent server farm arrangement), and transfer over multiple transmission paths (FIG. 20).

Figure 10:
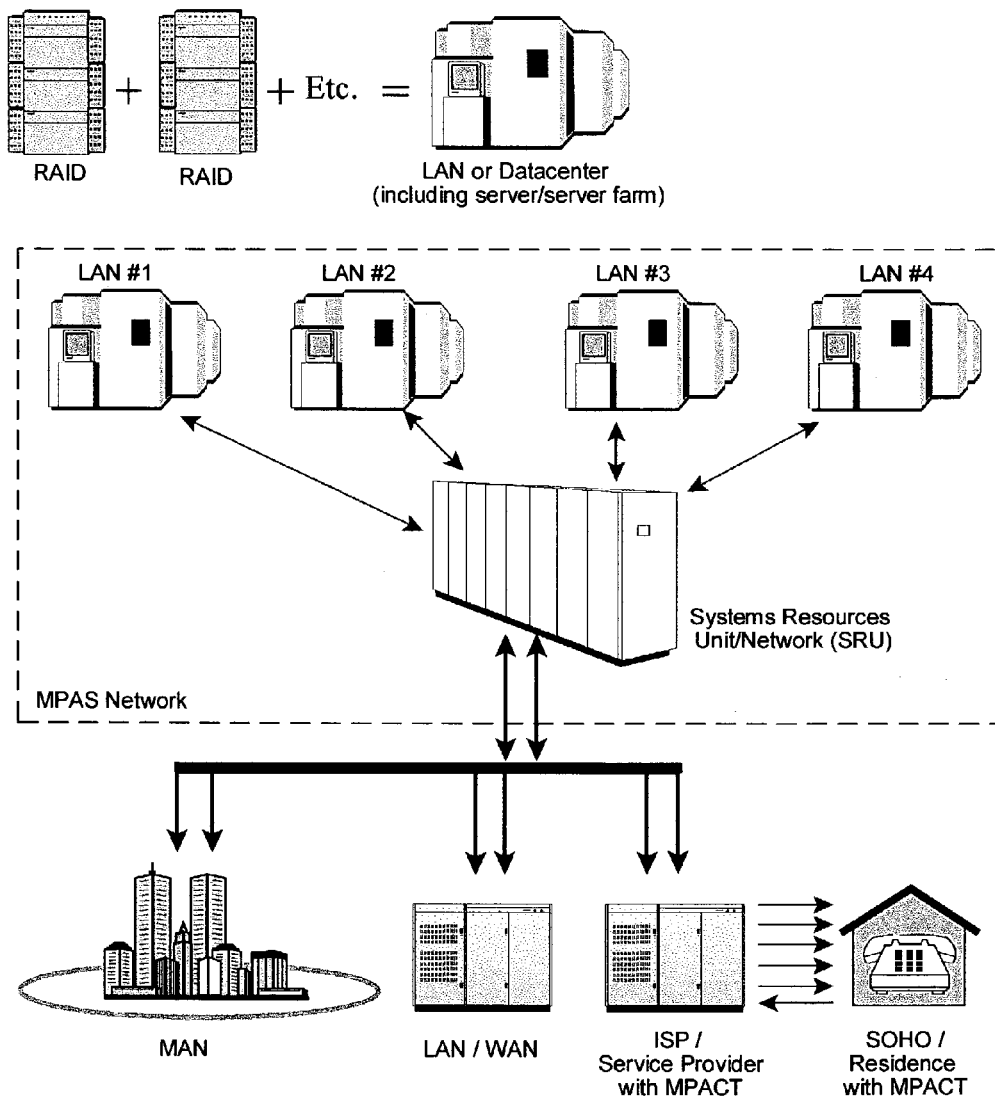
FIG. 10—depicts how the MPAS systems resources unit (SRU) functions in a network.
Figure 19:
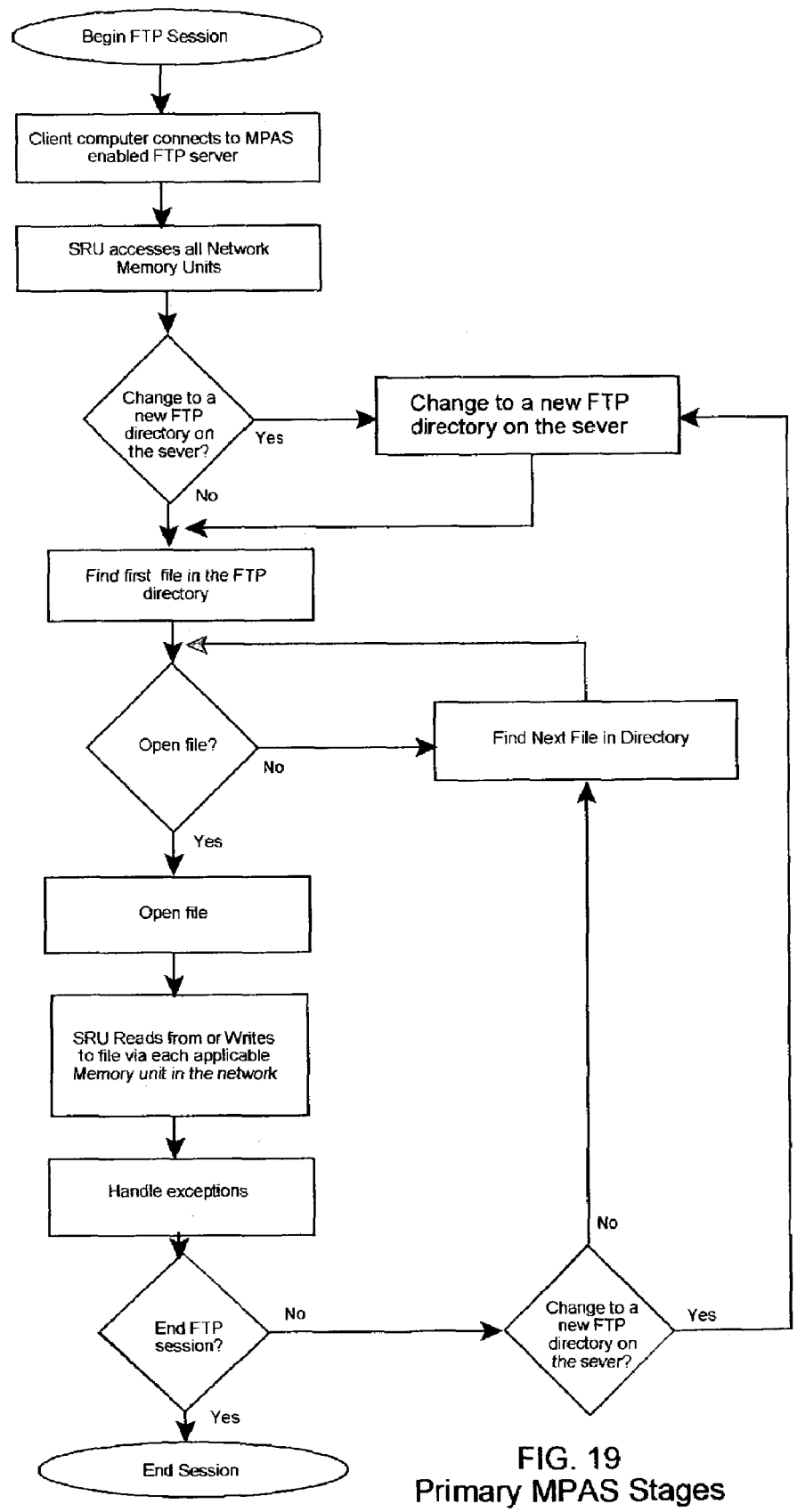
FIG. 19—is a flow chart illustrating the primary stages required in the MPAS process.

MPAS design and management may be achieved by utilizing a computer server, element manager, and/or network (depending upon required transmission rates), with a System Resources Program, all of which are hereafter referred to as the system resource unit/network (SRU)—(FIG. 10, FIG. 19).

The SRU will manage file transfer by referencing a local database containing a listing of all files, file segments and addresses in each network within the internetwork, accessing said file segments and ensuring file receipt via TCP/IP, and/or other protocol with verification process.

The device is capable of functioning as a multi network RAID (type) controller and may interface (directly or indirectly) with an MPACT—Data Management System (DMS), in order to map the most efficient path for parallel transmission from the servers/server farms, to a device capable of receiving parallel transmissions.

In designing an MPAS system, the outgoing connections (whether T1, OC-192, etc.) for each network are matched, and the desired number of networks established. Instead of mirroring files as in a traditional RAID configuration, mirroring will take place at the network level thus providing more robust redundancy. Error correction will be managed by the System Resources Program. Thus, the entire internetwork will function as a parallel striped RAID system.

After determining the number of RAID subsystems (or equivalent nonvolatile memory), each file is divided into the same number of segments at a minimum, hence an internetwork consisting of two LANs (each LAN containing two ten disk RAID systems) will have files divided into a minimum of forty segments, which are in turn striped across the disks of each RAID, one segment per disk. Since in this instance there are two networks, when accessing a file, the SRU will divide the file into two sections assigning segments 1-20 to LAN "A" and segments 21-40 to LAN "B".

The SRU monitors file transfer, and may reassign the transfer of each file segment as needed. The power of this feature becomes apparent when five or more networks are used with multiple high speed connections per network and an unforeseen occurrence prevents a particular file segment from being transferred initially.

Data from each LAN is forwarded to an I/O port which is then interfaced with either a dedicated or shared high speed connection (Ethernet, T1, ATM, etc.) and may or may not be forwarded to an intermediary service provider with sufficient DCE devices for transfer to the recipient.

For enhanced transmission speed, those networks with multiple communications channels (T1, DSL, microwave, etc.) will utilize a parallel transmission protocol or equivalent software to transfer packets to a phone company Central Office (CO), ISP or other intermediary with an MPACT Data Management Section for parallel/massively parallel transmission to the recipient. Hence the program providers' data servers, are interfaced to an MPACT—DMS either through the SRU (option A), or via bypassing the SRU with a direct connection to the DMS (option B), as required by the service provider.

Figure 11:
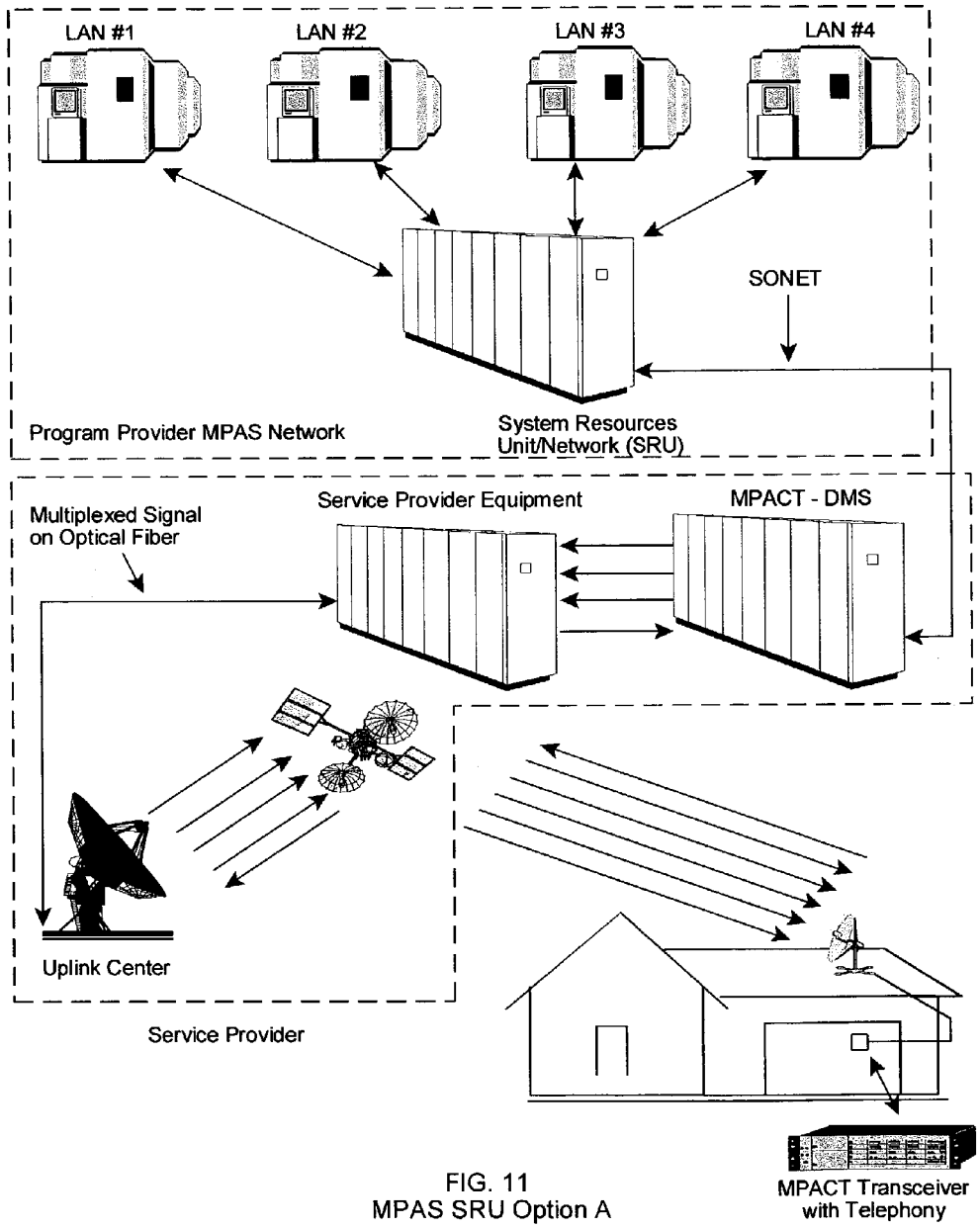
FIG. 11—illustrates data transfer characteristics of routing data through the SRU (option A).
Figure 12:
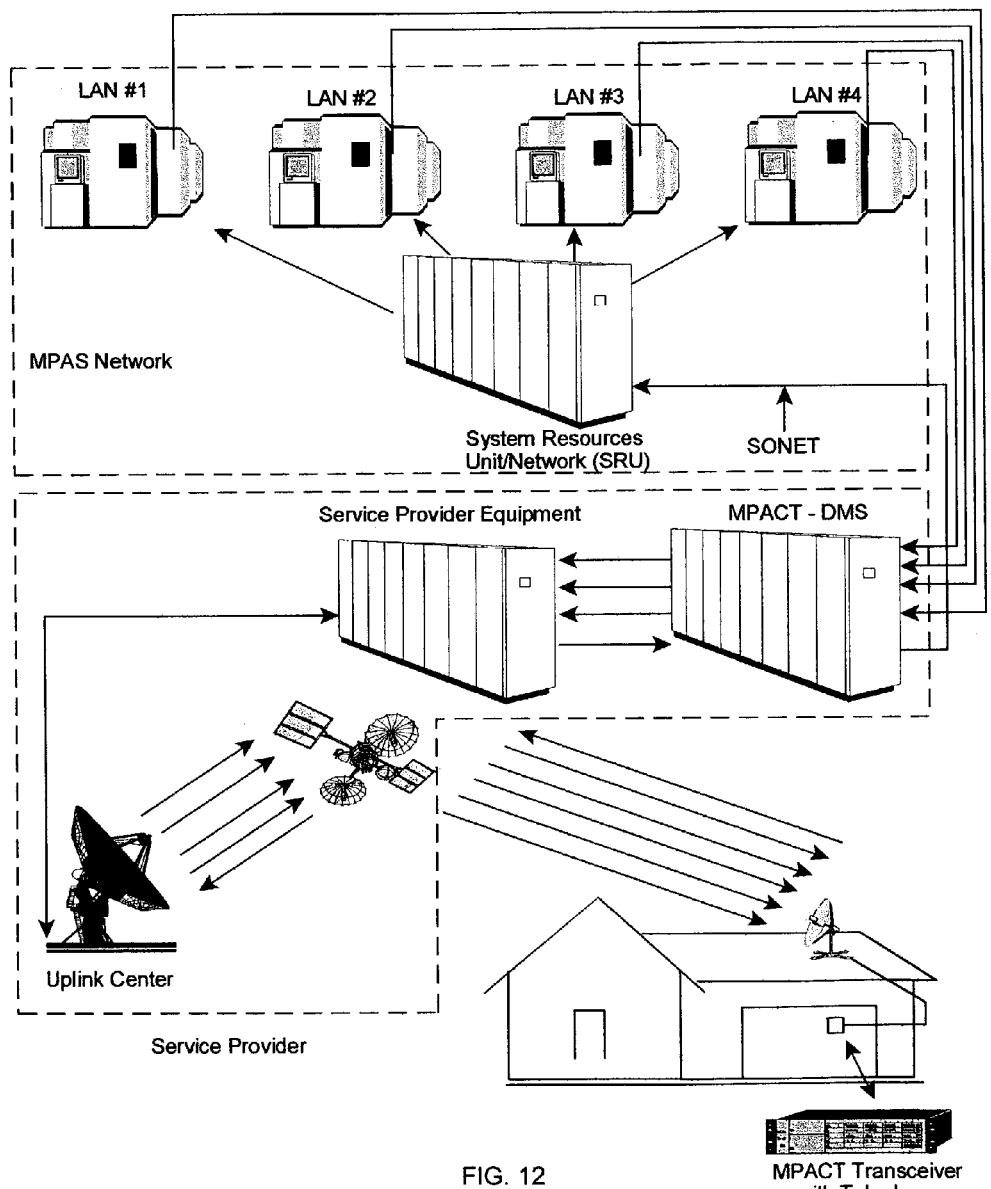
FIG. 12—illustrates data transfer characteristics of bypassing the SRU with a direct connection to the DMS (option B).

The service provider may choose either option A or option B because of their routing transfer characteristics. Routing the file data through the SRU (option A) will provide more efficient error checking, while a direct connection between each of the networks/LANs and the DMS (option B) will provide a more robust overall data connection via multiple pathways, and may allow higher transmission speeds (FIG. 11 and FIG. 12).

Because MPAS is employed at the network level, it is not concerned with the preferential components which make up the individual network(s) (e.g., hard drives vs. a fibre channel, PCI vs. SCSI, DSL vs. cable modem or ATM, etc.). This serves in some part as a hedge against obsolescence, its primary focus is on the management of data files, i.e., the acquiring of data and providing of high bandwidth via parallel transfer from multiple points to a single location, error checking, and providing robust redundancy. Hence, MPAS utilization may occur with two or more networks (RAID systems, LANs, WANs, etc.), whether in the same vicinity or in geographically different locations.

EXAMPLE 2

Susan's CATV company owns a video-on-demand network which consists of four LANs in three states. Each LAN consists of two ten-disk RAID systems which share three ATM feeds in parallel (with pTCP/IP, pFTP or equivalent software) to the regional hub, whose MPACT—DMS is interfaced to a one hundred ten channel CATV system which utilizes MPACT technology to multiplex with and transmit Movie-on-Demand services over ninety-five channels in parallel downstream to the subscriber pursuant to Example 1. Each RAID has a copy of a movie which is divided into ten file segments and striped across the ten disks which make up the RAID subsystem (FIG. 11).

Hence, when Susan Requests a Movie:

A. The request is forwarded to the MPAS, SRU which then locates the four copies of the movie in its database along with the addresses of each file segment on each of the eight RAIDs in the internetwork B. The SRU coordinates the parallel transmission of file segments from eight the RAIDs onto twelve ATM feeds (three ATMs per LAN in parallel), thus RAID 1 will transmit section 1, RAID 2 will transmit section 2, and so on.

C. The ATMs are interfaced to an MPACT—DMS either through the SRU (option A) or by direct connection (option B) as required by the service provider.

D. Which in turn is interfaced with the CATV company's transmission equipment which transmits the movie in parallel via ninety-five channels to Susan's MPACT compatible interactive set-top box.

E. The SRU verifies that each packet has been received via TCP/IP and or other verification process.

F. When file transfer is complete, the transmission session is terminated pursuant to protocol.

Multipoint Parallel Server Generation 2 (MPAS-2)

(FIG. 20) MPAS-2 is the second generation of MPAS, and is based upon the principle that data transfer associated with Local Area Network (LAN) topologies and architectures, can be substantially enhanced to the point of multiple Terabits per second and beyond, by the utilization of massively parallel data transfer within a specialized Storage Area Network (SAN), SONET, and network miniaturization by:

Miniaturization of volatile and nonvolatile memory units

Utilizing solid state memory devices with low access times

Increasing the number of memory units (i.e., hard drives, fiber drives, Flash cards, etc.)

Enhancing the internal bus architecture of what is in effect a Network Attached Storage (NAS) system to accommodate additional memory units, resulting in a 1:1 ratio between each memory unit and a dedicated bus. Thereby using miniaturization to force the Systems Resource Unit (SRU) to operate much like a RAID controller instead of an element manager by managing the read/write process, however doing so in parallel, and assigning its own corresponding I/O addresses for each memory unit. —This is distinguished from traditional MPAS in that traditional MPAS reads from and writes to the memory units of separate RAID systems, and LANs, in parallel.

Utilization of an IEEE 802.3 modules and TCP/IP protocols, Time Division Multiplexing, an internal optical bus with wave division multiplexing, and SONET for data transport.

Currently one of the most efficient means in which large scale miniaturization of memory (volatile and nonvolatile) can be accomplished is by utilization of Chip Scale Packaging (CSP) for Flash Memory Devices manufactured by Intel®.

This technology was originally designed to meet the needs of hand-held applications such as cellular phones, pagers, personal digital assistants (PDA) and Global positioning systems (GPS). Furthermore, embedded applications such as networking, automotive, set-top boxes, tele/data communications, and measurement equipment products are other intended uses for this technology.

One variant of this technology incorporates what is known as Stacked-CSP and combines Flash memory and an SRAM onto a single silicon chip. Current density values include a chip which has 32-Mbit Flash memory and 8-Mbit SRAM, with an Access Time of 70 ns.

Since Flash technology is designed for nonvolatile memory storage, this may take the place of hard dives or fiber drives as used in traditional MPAS systems. Although the size and storage densities of the chip are small, this is an advantage because MPAS combines and utilizes the storage capacity of the entire system, and provides for highly parallel data transfer via each storage unit.

Therefore in keeping with MPAS concepts, a predetermined number of Stacked-CSP chips can be placed on a number of printed circuit boards (e.g., twenty-five chips per board on three hundred boards), each chip can be controlled/addressed in the same manner as with traditional MPAS (via an SRU and/or server).

However, because of miniaturization, the MPAS-2 system may be configured in a modular shelf—frame design, in order to facilitate large numbers of printed circuit boards (PCBs), each containing Stacked-CSP chips.

Because PCB space is at a premium, each chip may be interfaced to an optical/electrical transceiver for sending/receiving data, control signals, etc. over an optical bus to the server and/or SRU. This interface should be as close to the chip as possible. One method of accomplishing this would be the interfacing with, and utilization of, the Lucent Technologies® TransLight™ transponder module (or similar technology).

TransLight™ is a member of a family of high-speed optical transceiver modules that combine up to 15 optical and electrical devices into one module approximately 3.5×2.5 inches. The family consists of two modules that transmit and receive optical signals in high-speed optical networking communications systems. In addition, the first module also multiplexes and demultiplexes electrical signals, while the second module converts optical signals from one wavelength to another—a function used in dense wavelength division multiplexing (DWDM) systems.

Using Bell Labs flip-chip packaging processes, each transponder integrates a transmitter, receiver, and up to 15 individual integrated circuits (ICs) onto the same physical package. This significantly reduces system costs, and power consumption and increases port densities by as much as 50 percent.

It also incorporates Lucent's BiCMOS SONET jitter-compliant clocking devices—the TTRN012G5 clock multiplexer and synthesizer, and the TRCV012G5 integrated demultiplexer, clock recovery and limiting amplifier. In addition, by integrating the TDAT042G5 multi-protocol framing and data termination device, the optical networking terminator provides an integrated solution spanning the packet- or cell-data-enhanced Utopia 3 interface through the optical fiber connectors.

The transponders interface directly with Lucent's transmission data (TDAT) SONET/SDH ICs to form a complete line card solution from the optical fiber to the equipment backplane. The chips transmit data using multiple network protocols at OC3, OC12 and OC48 data rates and support simplified data link (SDL) or direct data-over-fiber operation.

This (or similar) technology may be interfaced with each Stacked-CSP chip on the previously mentioned (PCBs) to provide each memory unit with a high speed optical bus, this concept is at the core of MPAS-2 massively parallel network architecture.

Hence as with the standard MPAS architecture, data is routed to/from to the SRU. The next unit which handles data flow is a multiplexer, the process also utilizes SONET, and a router/switch to route data to the requesting terminal.

As a result of miniaturization, the SRU will function as a server configured with its own CPU, solid-state memory and of modular shelf design. Furthermore, a service provider or network administrator may choose to program the SRU so that the MPAS-2 system may be used as sort of "super RAID" system by storing two copies of data for redundancy, with appropriate data striping for a single network configuration; or he/she may program the SRU to store multiple copies of files on several MPAS-2 systems for even greater redundancy and speed, and security.

When compared to a distributed topology such as a standard Storage Area Network (SAN), MPAS-2 provides substantially greater speed, fault tolerance and security as a result of more robust data storage, and highspeed pathways using massively parallel data transfer and protocols.

These features are further enhanced with the addition of each MPAS-2 PCB, shelf, frame or system. Hence one example of specifications for a Two-Terabit per second MPAS-2 network may be as follows:

Chip & PCB Characteristics
- 2 Terabyte (Tb)÷32 Mb=65,500 chips
- 65,500 chips÷25 chips/printed circuit board (PCB)=2,500 PCBs
- 25 chip per board×25 boards per shelf=625 chips per shelf
- 625 chips per shelf×5 selves per frame=3,125 chips each side of a frame
- 3,125×2 (dual sided frame)=6,250 chips per frame
- 65,500 chips (total)÷6,250 chips per frame=10.48 or 11 frames (the $11^{th}$ frame will also house the SRU/Server, router/switch and power supply)

Physical Characteristics
- Each board=1"W×10"H×12"D and contains 25 chips
- Each shelf—contains 25 boards with ⅛" clearance between boards=interior dimensions of 28.25"W×10.25"H×12.125"D
- Each Frame (Dual sided with air circulation)—5 shelves high with 1" (2" at base) clearance=58.25"H×31.25"W×40"D
- Network—11 frames=343.75" or 28.64" long; this unit will be divided into two rows of 14'. The resulting overall footprint is (with a 32") isle between rows 9.5'W×14' or 133 square feet.
- Network Bus Architecture=Fiber Optic Storage Capacity & Memory One Stacked-CSP=32-Mbit Flash and 8-Mbit SRAM with an Access Time of 70 ns, Hence:

TABLE 1

| Unit | SRAM | Storage |
| --- | --- | --- |
| PCB | 100 Mb | 800 Mb |
| Shelf | 2.5 Gb | 20 Gb |
| Frame | 25 GB | 200 Gb |
| Network | 262 Gb | 2.096 Tb |

Terminal Interface

MPAS-2 provides for the interfacing of the terminal to the network in three ways:
- Personal Storage Device (PSD)—A solid state apparatus based upon the MPAS-2 concept of massively parallel data transfer and storage. The PSD sits between the Work Station and router, and is connected fiber optically.

Data is stored and transmitted between the PSD and the network via high speed parallel transfer; a high speed Ethernet interface exists between the PSD and the workstation, hence the PSD will assist in relieving network congestion (which would otherwise be caused by the slower Ethernet speeds and workstation read/write times), while providing enhanced storage for the workstation.
- Enhanced Personal Storage Device (E-PSD)—A portable, upgraded version of the PSD which conforms to the OSI/IEEE stack thus insuring compatibility with existing personal computers, LANs, and WANs. The system is internal to the computer and permits both traditional data transfer, and parallel data transfer. The system may be interfaced with the PSD for massively parallel data transfer and enhanced nonvolatile memory storage.
- MPAS-3—The third generation of MPAS utilizing current MLI, LSI miniaturization and SONET. The use of this process may provide end-to-end Terabit to Petabit bandwidth in LANs and WANs, contained in packages which range in size from a standard tower Personal Computer to a network with a footprint of 133 square feet per the aforementioned physical specifications (the MPAS-2, 2-Tb network above).

Enhanced Personal Storage Device (E-PSD)

Figure 17:
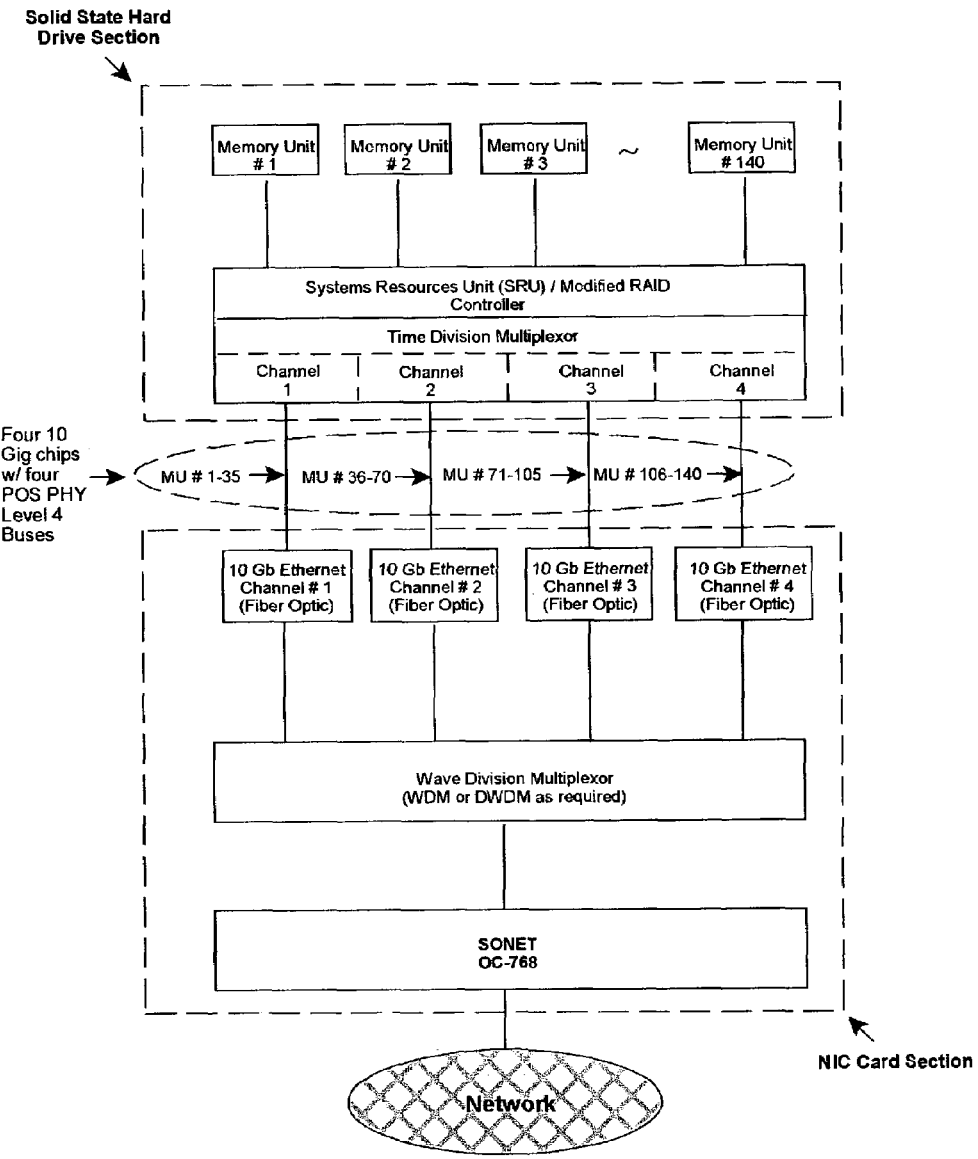
FIG. 17—depicts the enhanced personal storage device (E-PSD).

One illustration of the practicality and power of MPAS-2 is the Enhanced Personal Storage Device (E-PSD). The E-PSD is an offshoot of the PSD and may be designed and constructed pursuant to MPAS-2 specifications. The primary focus of this device is to provide existing computers and networks with enhanced bandwidth, via parallel data transfer technology utilizing off-the-shelf components; industry standards such IEEE 802.2 and 802.3 for adherence to the OSI stack (for LANs and WANs), and for smooth integration into current networks thereby reducing cost (FIG. 17).

The E-PSD works with the Network Operating Systems (NOS) via software at the application layer of the OSI stack, in addition utilizing parallel 10 Gigabit Ethernet and SONET. The E-PSD is designed to look and operate in a manner similar to that of an Ethernet Network Interface Card (NIC) (utilizing fiber), and is used with a specialized solid state hard drive.

The System Embodies of Two Major Sections:
- Memory and memory management.
- Packet processing and transmission i reception.

Memory and Memory Management

For this particular unit, the memory section will consist of an internal solid state RAID employing one hundred forty CSP chips with a flash memory density of 256 Megabits each, for a total of 35.84 Gigabits. This unit will be designed to look much like a traditional internal hard drive.

Since MPAS-2 technology accesses each storage device (CSP Chip) as if an individual hard drive, the term memory unit (MU) will be used within the confines of this E-PSD discussion.

Inside the hard drive assembly, the chips will be placed on four printed circuit boards at thirty-five chips per board. The boards are then stacked atop each other with space between for air flow. The appropriate bus has been designed to permit parallel access to/from and control of each chip, in addition to the connections to the Systems Resources Unit (SRU) which will be on a separate board, for a total of five boards (the SRU will have its own memory unit/chip).

The hard drive assembly will serve the needs of the host computer in the same manner as a local RAID system, with internal bus and drive interfaces which are in harmony with the host architecture (e.g., ISA, PCI, IDE, SCSI, etc.).

Pursuant to MPAS-2 technology, the SRU functions as a modified RAID controller, via data striping with respect to its memory units, maintenance functions, in addition to overseeing uniform parallel reading/writing of the same. The SRU has the additional advantage of adhering to 802.3 protocols so that it will function seamlessly in concert with nonparallel nodes which are not of MPAS design.

In this particular model, half the SRU will take integrated circuit (IC) form with the other half serving as a software module which will interact with the Network Operating System (pursuant to the application layer of the OSI/IEEE 802.3 stack).

The SRU-IC will have one hundred forty inputs from the associated memory units. The SRU-IC is also coupled with a Time Division Multiplexor (TDM), which consolidates the one hundred forty outputs into four channels of thirty-five outputs each (since this is a bidirectional system, it is understood that the terms input and output are relative and depend upon whether the system is reading from or writing to the memory units).

The memory assembly is connected via four 10 gigabit chips with fiber optic capacity (for example the PMC-Sierra PM5390 S/UNI-9953) and four POS PHY Level 4 buses to the NIC card which contains the "Packet Processing and Transmission/Reception" portion of the system in this model.

Although adhering to IEEE 802.3 and TCP/IP protocols, the SRU manipulates IP connections by assigning its own I/O addresses to each of the memory units and incorporating extra steps in the protocol so that two computers (whether both use MPAS, or a combination of MPAS and MPACT) during client/server and peer-to-peer transmissions will recognize multiple connections within a single session. Therefore, a comparatively fast network router/switch will be utilized, resulting in enhanced bandwidth via the extra data channels and uniform parallel data flow.

Packet Processing and Transmission/Reception

As FIG. 17 depicts, each of the four channels from the Multiplexors will be interfaced to a separate 10 Gigabit Ethernet module. These modules will encode/decode, use collision detection by CMSA/CD, and will conform to IEEE 802.3, 10000BaseF standards. In turn the Ethernet modules will interface with a Wave Division Multiplexer (WDM) or Dense Wave Division Multiplexer (DWDM) for a maximum output/input of 40 Gigabits per second.

The Wave Division Multiplexer is interfaced with a SONET module with an OC-768 connection (satisfying the Physical layer of the OSI stack) to the network and may also utilize TCP/IP protocol for reliable transport.

Where the network has a router/switch operating at one terabit per second (for example), and a server /server farm with corresponding parallel technology, the network will in effect have one hundred forty data channels available to each user (with comparable technology).

The use of Time and Wave Division Multiplexers, in addition to SONET will compress the data stream resulting in a ratio of 140:1; so the overall amount of traffic which the network "sees" will remain the same.

Therefore the addition of one hundred thirty-nine transmission channels providing data transfer in parallel, with a total bandwidth of 40 Gigabits per second, and read/write times of one second or less; may result in no bottleneck other than the speed at which the solid state hard drives can read/write in parallel which approximately 70 nano seconds.

For the purposes of future expansion in memory and bandwidth, the E-PSD card may be interfaced fiber optically to a PSD. Hence, when the network is upgraded, a bridge may be placed after the PSD so that one or more computers in the sub-network may access it. In turn because of its larger physical size, the PSD can facilitate greater memory and data channels than the E-PSD. Therefore this unit in turn may be interfaced via multiple SONET connections (for example) to a server/server farm capable of massively parallel data transfer pursuant to MPAS-2 or MPAS-3 technologies.

By utilizing 10 Gigabit Ethernet with its associated implementation of TCP/IP, and SONET, this satisfies the Physical, Data, Network and Transport layers of the OSI/IEEE stack (although only the Physical and Data layers are required for IEEE compliance).

Therefore this system will be compatible for existing computer networks and personal computers, and will only require software programming at the application layer of the OSI stack for use with all Network Operating Systems (i.e., Windows 2000, Unix, Linux, etc.).

Multipoint Parallel Server Generation 3 (MPAS-3)

Stacked-CSP chips are a relatively new technology, and as such, its current state may be compared to the transistor in that they are solid state devices, and will benefit from the current technologies available with microchip miniaturization.

Under current technology SSI (small-scale integration) means transistors in the tens, MSI (medium scale integration) meant a microchip containing hundreds of transistors, LSI (large-scale integration) refers to microchips containing thousands of transistors, and VLSI (Very Large Scale Integration)—the current level of computer microchip miniaturization, refers to microchips containing hundreds of thousands of transistors.

When one considers that MSI means the integration of hundreds of transistors on a single chip, and current Flash technologies allow for storage densities of 1 Gigabit, the technology exists to integrate hundreds of Stacked-CSP chips into a single microchip package—conservatively.

Therefore, when compared to the aforementioned MPAS-2 2-Terabit network, utilization of MSI at a minimum would provide the equivalent of 4 PCBs per chip hence:

TABLE 2

| | Equivalent # of PCBs in MPAS-2 network | Storage per PCB | SRAM per PCB | Required # of PCB for 2-Tb system |
|---|---|---|---|---|
| MLI | 4 | 80 Gigabit | 10 Gigabit | 25 |
| LSI | 40 | 800 Gigabit | 100 Gigabit | 2.5 |

Most importantly MSI and LSI integration would allow for the massively parallel data paths which are critical to MPAS technology. This being the case, fewer Wave Division Multiplexors would be required, and technologies such as TransLight™ can be modified to provide interfacing with each memory unit after LSI has been applied. This would result in network size being reduced by a factor of one hundred or more.

Hence desk-top sized servers/workstations capable of data transfer on the Terabit per second tier become a reality, thereby increasing LAN Bandwidth by 1,000 (one thousand) times—Comparison traditional Gigabit Ethernet.

Additionally, when substituting the new PCB values for those of the aforementioned MPAS-2 network specifications, the resulting network would produce data transfer on the Petabit per second level.

While it could be argued that current technology dose not support 800 Gb flash densities It is important to remember that the "power" of MPAS chiefly lies in massively parallel data channels, not memory densities.

Hence even with current Flash densities of 1 Gigabit it is possible to design two PCBs (twenty-five chips each, each chip containing thousands of miniature Stacked-CSPs which in turn have densities of only one hundred bits each) with a total storage capacity of 50 Gb via LSI and VLSI, and have plenty of space available for the massively parallel bus architecture and SONET interfaces contained within each chip and on PCB itself.

When considering this concept of number vs. memory density, it may be helpful to remember how neurons function in the brain, hence the correlation between MPAS-3 and the human brain and nervous system:

TABLE 3

| MPAS-3 | Brain & Nervous System |
|---|---|
| CPU | Reasoning |
| PCBs | General Memory |
| SRU | Cerebellum |
| | Network administration |
| | Autonomous functions |
| micro Stacked-CSPs (after MSI, LSI) | Neurons |
| Flash | Long term memory |
| SRAM | Short term memory |
| Fiber Optic bus (post WDM/SONET) | Spinal cord |
| Massively Parallel bus architecture (Pre WDM) as result of MSI/LSI | Nervous Network |
| Terminals, Workstations, Peripherals | Nerve Endings |

Parallel Data Transfer Application Software

Data transfer can be enhanced by use of software which mirrors the effects of the aforementioned. Having been in use for over twenty years, TCP/IP has demonstrated a relatively high degree of dependability and incorporates application layer protocols such as FTP, GOPHER, HTTP, and messaging protocols such as SNTP and NNTP.

Figure 21:
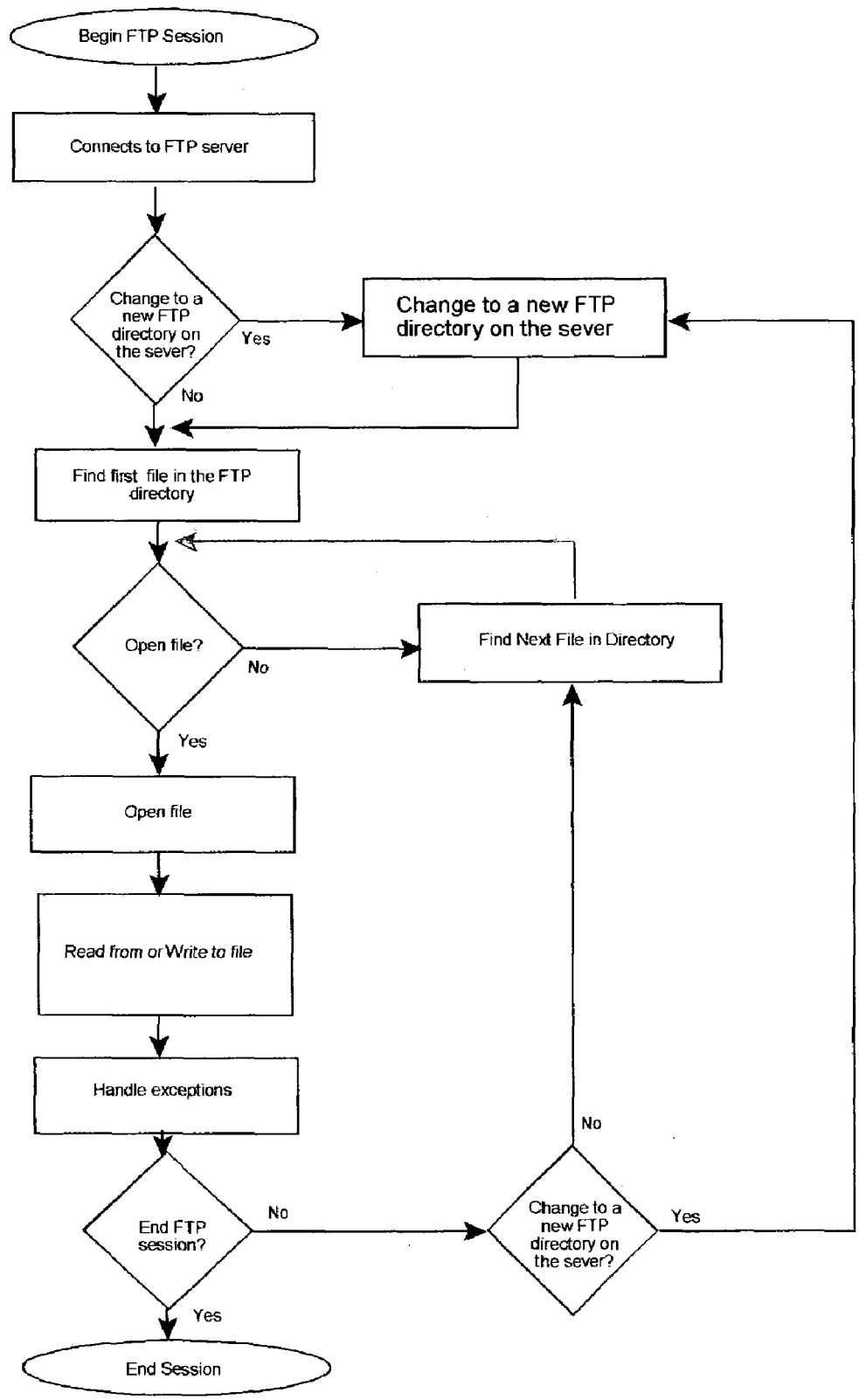
FIG. 21—is a flow chart illustrating the primary stages required in typical FTP file retrieval.

The following example illustrates the steps in a typical FTP client application written in Visual C++ (a superset of the C programming language). This application is compatible with the Microsoft® Windows operating system (HTTP, GOPHER and other application protocols follow the same general format), however the concept may be adapted to fit additional operating systems such as UNIX, LINUX, etc. (FIG. 21).

TABLE 4

| Your Goal | Actions Taken | Effects |
|---|---|---|
| 1. Begin an FTP session | CinternetSession | Initializes WinInet and connects to server |
| 2. Connect to FTP server | CInternetSession::GetFtpConnection | Returns a CFtpConnection object |
| 3. Change to a new FTP directory on the server | CFtpConnection::SetCurrentDirectory | Changes the directory you are currently connected to on the server |
| 4. Find the first file in the FTP directory | CFtpFileFind::FindFile | |
| 5. Find the next file in the FTP directory | CFtpFileFind::FindNextFile | |
| 6. Open the file found by FindFile or FindNextFile | CftpConnetcion::OpenFile, using the file name returned by FindFile or FindNextFile | |
| 7. Read from or write to the file | CinternetFile::Read or CInternetFile::Write | Reads or writes the specified number of bytes, using a buffer you supply |
| 8. Handle exceptions | CinternetException | |
| 9. End the FTP session | Dispose of the CInternetSession | Automatically cleans up open file handles and connections. |

Figure 22:
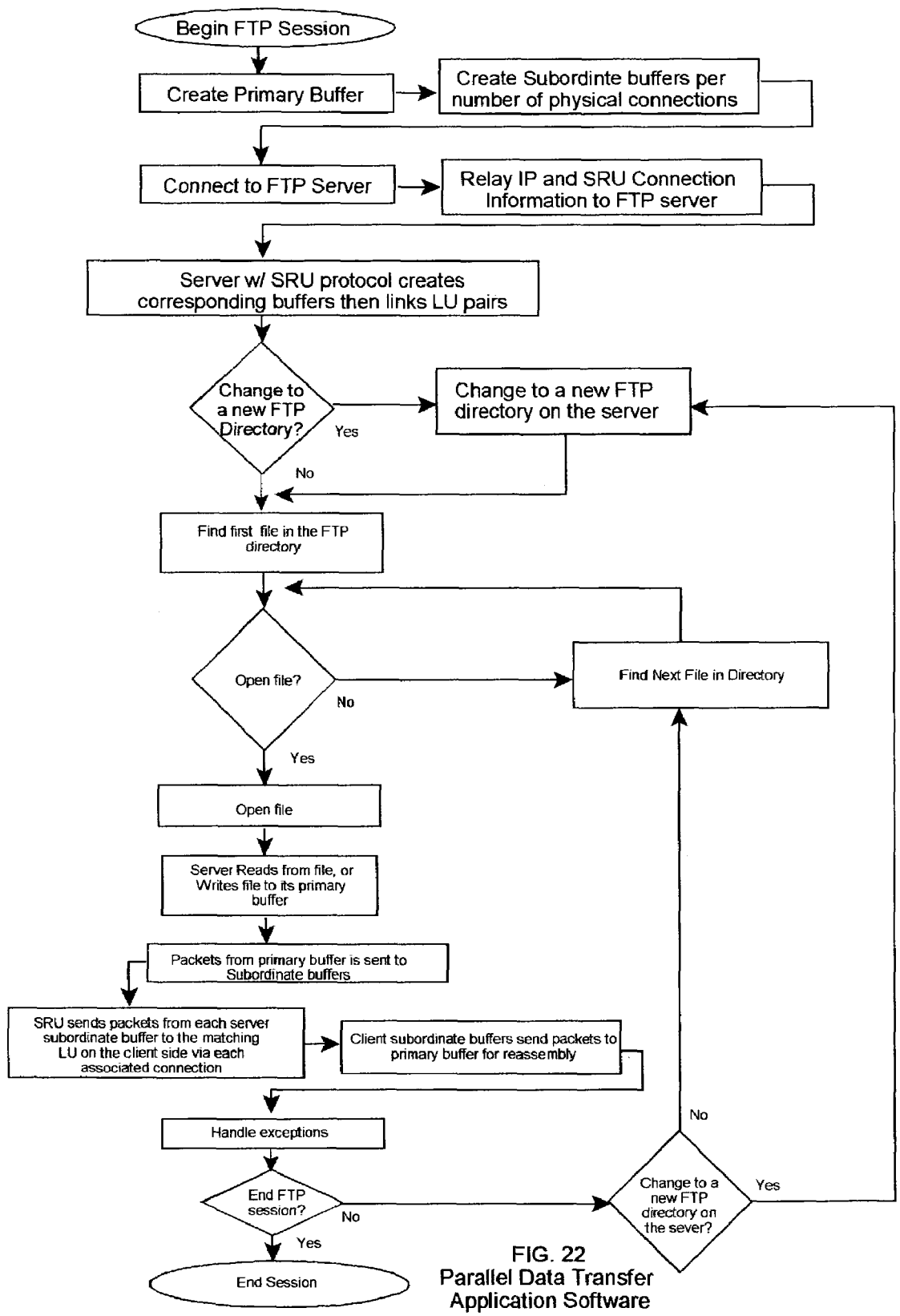
FIG. 22—is a flow chart illustrating the primary stages represented in parallel FTP file retrieval by via Parallel Transfer Application Software.

Rather than "reinventing the wheel", a software application can be utilized which will take advantage of all of the features inherent to TCP/IP, with the ability to facilitate additional communications paths and send/receive data in parallel (FIG. 22).

This may be accomplished by abstracting the protocols into high-level application software and/or firmware (per OSI and IEEE stacks) which will interface and interact with each applicable protocol. The application will be coupled with web browser type software for customer interface, and may function in one of two manners depending upon whether the client is utilizing MPAS. If the client is not using MPAS, but is using an MPACT enabled transceiver, the application software will provide additional steps to TCP/IP and FTP which will enable Internet client/server application to:

Client—Create a primary buffer

Client—Create subordinate buffers corresponding with the number of associated connections.

Client—Establish multiple connections for the session and relay appropriate IP information including the number of physical connections associated with the session to server.

Server—Create a primary buffer

Server—Ascertain the number of connections associated with the session

Server—Create subordinate buffers corresponding with the number of associated connections.

Server—Serialize data in primary buffer

Server—Transfer data into subordinate buffers in sequential order

Server—To the extent possible, establish connection pairs between server and client subordinate buffers Server—Transfer data from subordinate buffers to client subordinate buffers Client—Packets received in subordinate buffers are sent to primary buffer for reassembly and ending of session pursuant to TCP/IP protocol.

The servers' primary buffer can transfer data from subordinate buffers in a manner which will enhance parallel transfer to client. For example, a client actuates a session with four parallel connections labeled A-D. The application establishes a primary buffer and assigns a buffer for each connection, and communicates the number of connections associated with the session and other relevant information to the server side of the application.

On the server side, a primary buffer is established along with four subordinate buffers corresponding to buffers A-D on the client side. The servers' primary buffer serializes the data into packets and sends packet 1 to subordinate buffer A, packet 2 to buffer B, etc. This results in a more uniform parallel flow of packets to the client.

In this manner the server/client application may permit the connection between each pair of logic units (LUs i.e. server buffer A to client buffer A, etc.) to function independent of the other pairs to this extent, with TCP/IP guaranteeing that data sent from one end is received on the other. Another option, is to establish a primary LU pair between steps 1 & 2, which will provide two-way transmission for oversight of the entire session via TCP/IP or FTP. —It should be noted that the terms LU and logic unit or restrictive to this context, and should not be confused with the terms Logical Unit (LU), and Physical Unit (PU) which are associated with the nomenclature of systems network architecture (SNA).

The advantage to this approach is that should one or more connections fail, the client/server application can be programmed to sense this, and the servers' primary buffer can reallocate the packet flow to correspond with the remaining number of connections. Furthermore the application can also be programmed to monitor the performance of each connection and reallocate packets to compensate for one or more slow connections.

Most client applications would perceive the sequential transfer of packets in parallel over multiple connections as high bandwidth streaming data, hence the ability to view data in real time over a redundant "feed". The advantages to the Internet, Video on Demand Systems, news organizations, CATV and satellite TV systems (especially DVB), Military, surveillance systems and others are apparent.

The software can be constructed with a graphic user interface (GUI) which will allow users during set-up to enter relevant information about their computer and number/type of connections. Hence it is flexible in that it has the potential to be utilized in a wide array of circumstances.

Parallel Data Transfer Application Software when Used with MPAS

Where MPAS technology is used, the subordinate buffer and related features will be disabled, because the architecture of these two processes are in effect redundant since one is a software version of the other.

With MPAS individual memory units residing on the server and client are used instead of the logic units used by the software model. The SRU manages the read/write process, and to the extent possible establishes a 1:1 interface for each memory unit during the server/client or peer-to-peer session. As with Parallel Data Transfer Application Software, where the number of connections between two terminals are different, the SRU will assign data flow at the lower number of connections.

What I claim as my invention is:

1. A system for enhanced network communications comprising
    a data management section configured for connection to and to receive data packets from at least one of a CATV content provider, a telephony service provider, a telephony subscriber, an Internet, a WAN, a MAN and a LAN, and configured for connection to at least one of a network transmission equipment and a broadcast equipment of a service provider, wherein the at least one of the network transmission equipment and the broadcast equipment of the service provider comprises at least one server system configured to implement at least one of FTP, HTTP, NNTP, and SNTP protocols, the data management section comprising at least one hardware broadcast routing device, wherein the at least one broadcast routing device comprises a plurality of ports, and wherein the at least one hardware broadcast routing device is configured to route the data packets in parallel over the plurality of ports to the at least one of the network transmission equipment and the broadcast equipment of the service provider;
    a multipoint parallel server distributed network connected to the data management section and configured to transmit the data packets, comprising at least one of files and file segments, to the data management section, the multipoint parallel server distributed network comprising a system resource unit connected to a plurality of memory units; and
    a user transceiver including a plurality of ports configured to receive data transmitted in parallel through at least one of multiple frequencies and multiple channels from the at least one of the network transmission equipment and the broadcast equipment of the service provider, wherein the user transceiver is configured to:
        initiate a TCP/IP session;
        create a primary buffer;
        connect to the system resource unit and request at least one file from the system resource unit;
        create a plurality of subordinate buffers, wherein each of the plurality of subordinate buffers corresponds to at least one of the plurality of ports of the user transceiver;
        establish a plurality of connections for the TCP/IP session and transmit to the system resource unit IP information comprising an amount of the plurality of ports of the user transceiver associated with the TCP/IP session;
        receive into the plurality of subordinate buffers the at least one file from the multipoint parallel server distributed network through the plurality of connections of the TCP/IP session;
        transmit the at least one file from the plurality of subordinate buffers to the primary buffer; and
        assemble the at least one file using the primary buffer;
    wherein the multipoint parallel server distributed network is configured to:
        store the at least one file as at least one of a plurality of files and a plurality of file segments in the plurality of memory units; and
        access the at least one of the plurality of files and the plurality of file segments in the plurality of memory units and transmit the at least one of the plurality of files and the plurality of file segments from the memory units in parallel through at least one of multiple frequencies and multiple channels to the subordinate buffers of the user transceiver utilizing TCP/IP protocol.

2. The system of claim 1, wherein the data management section further comprises:
    a data management unit connected to the at least one Broadcast Routing Device configured to process the data packets for parallel routing through the broadcast routing device to the at least one of the network transmission equipment and the broadcast equipment of the service provider.

3. The system of claim 2, wherein the at least one broadcast routing device comprises a plurality of broadcast routing devices connected to the data management unit.

4. The system of claim 2, wherein the at least one broadcast routing device is connected to the data management unit via at least one of directly via a direct physical connection and remotely via a high speed connection.

5. The system of claim 1, wherein the user transceiver is configured to receive and transmit data in parallel through at least one of multiple frequencies and multiple channels from and to the at least one of the network transmission equipment and the broadcast equipment of the service provider.

6. The system of claim 5, wherein the at least one of the network transmission equipment and the broadcast equipment of the service provider is configured for satellite uplink.

7. The system of claim 5, wherein the at least one of the network transmission equipment and the broadcast equipment of the service provider is configured to provide data-on-demand to a service subscriber.

8. The system of claim 1, further comprising:
a plurality of tuners configured to receive parallel data from the at least one of the network transmission equipment and the broadcast equipment of the service provider; and
a switching circuit connected to the plurality of tuners and configured to associate a range of channels to each one of the plurality of tuners; and
a CPU connected to the switching circuit;
wherein the switching circuit is configured to control the each one of the plurality of tuners to switch channels upon receipt of at least one clock pulse of the CPU.

9. The system of claim 1, wherein the broadcast routing device is configured to transmit one data channel through each of the plurality of ports.

10. The system of claim 1, wherein the user transceiver is configured to receive data transmitted in parallel through at least one of multiple frequencies and multiple channels from the at least one of the network transmission equipment and the broadcast equipment of the service provider; and
a switch connected to the user transceiver, configured for selectively passing data to a recording device.

11. The system of claim 10, further comprising authorization equipment connected to the user transceiver configured to receive an authorization code or signal from the received data and configured to operate the switch based on at least one of a receipt of the authorization code or signal and a non-receipt of the authorization code or signal.

12. The system of claim 11, wherein the authorization equipment comprises an RF transmitter and the switch comprises an RF receiver, and wherein the authorization equipment is configured to operate the switch using an RF signal.

13. The system of claim 1, wherein the multipoint parallel server distributed network further comprises:
a plurality of servers configured for distributed storage of the at least one of the files and the file segments, and configured for parallel output of the data packets comprising the at least one of the files and the file segments; and
a system resource unit connected to the plurality of servers and in communication with a local database including a listing of the at least one of the files and the file segments, and associated addresses, accessible through the plurality of servers, wherein the system resource unit is configured to allocate the at least one of the files and the file segments among the plurality of servers and update the local database, and wherein the system resource unit is configured to access the at least one of the files and the file segments, to control the transfer of the data packets comprising the at least one of the files and the file segments to the data management section, and to verify receipt by the data management section of the data packets comprising the at least one of the files and the file segments.

14. The system of claim 13, wherein the system resource unit is connected to a plurality of LANs comprising the plurality of servers, the plurality of LANs being configured for distributed storage and parallel output of the data packets.

15. The system of claim 14, wherein the plurality of LANs are connected to the data management section and configured for parallel output of the data packets to the data management section.

16. The system of claim 13, wherein the system resource unit is connected to the data management section and configured for transfer of the data packets to the data management section.

17. The system of claim 1, wherein the user transceiver is further configured to transmit and receive data serially.

18. The system of claim 10, wherein the user transceiver is further configured to receive data serially from the at least one of the network transmission equipment and the broadcast equipment of the service provider, and the user transceiver is configured to store, access and process received data; and wherein the user transceiver is further configured to transmit data serially and in parallel to the at least one of the network transmission equipment and the broadcast equipment of the service provider.

19. The system of claim 11, wherein the authorization equipment comprises at least one electronic signaling device, and at least one signal recognition or reception device, and wherein the authorization equipment is configured to operate the switch based upon at least one of a signal input and the absence of a signal input.

20. The system of claim 1, further comprising:
a user device configured to access, store and process at least one of files and file segments from the at least one of the network transmission equipment and the broadcast equipment of the service provider; and
a switch connected to the user device, configured for data viewing, accessing, or selectively passing data to at least one other device or at least one network.

21. The system of claim 20, wherein the user device comprises at least one of a cellular telephone, a CATV set-top box, and a personal computer.

22. The system of claim 1, wherein the system resource unit is further configured to manage data flow, data verification and data correction through the at least one of the multiple frequencies and the multiple channels.

23. The system of claim 1, wherein the multipoint parallel server distributed network comprises a plurality of LANs comprising the plurality of memory units.

24. The system of claim 1, further comprising:
the at least one of the network transmission equipment and the broadcast equipment of the service provider, wherein the at least one of the network transmission equipment and the broadcast equipment of the service provider comprises at least one system configured to implement Voice over IP (VoIP) protocol; and
a user transceiver including a plurality of ports configured to at least one of send and receive data transmitted in parallel through at least one of multiple frequencies and multiple channels from the at least one of the network transmission equipment and the broadcast equipment of the service provider, wherein the user transceiver is configured to initiate or accept a VoIP session, maintain a VoIP session, and end a VoIP session pursuant to protocol.

25. The system of claim 1, further comprising:
the at least one of the network transmission equipment and the broadcast equipment of the service provider;

wherein the user transceiver is configured to download, from the at least one of the network transmission equipment and the broadcast equipment of the service provider, and store a digital stamp having permission information associated with downloaded data, and wherein the user transceiver is configured to access the digital stamp to determine a permission setting of the associated downloaded data prior to at least one of access and play the downloaded data.

26. The system of claim 1, further comprising:
the at least one of the network transmission equipment and the broadcast equipment of the service provider;
wherein the user transceiver is configured to download, from the at least one of the network transmission equipment and the broadcast equipment of the service provider, and store a digital stamp having permission information associated with downloaded data, and wherein the user transceiver is configured to access the digital stamp to determine a permission setting of the associated downloaded data prior to at least one of accessing and playing the downloaded data, wherein the downloaded data comprises at least one of a movie, a song, a music video, and a computer game.

27. The system of claim 5, wherein the user transceiver is configured to store, retrieve and reassemble data received in parallel implementing at least one of RAID and virtual memory configurations.

28. A computer readable storage medium tangibly embodying a program of instructions executable by a data management section to implement a method, the data management section being configured for connection to and to receive data packets from at least one of a CATV content provider, a telephony service provider, a telephony subscriber, an Internet, a WAN, a MAN and a LAN, and configured for connection to at least one of a network transmission equipment and a broadcast equipment of a service provider, the method comprising:
configuring a plurality of ports;
routing the data packets in parallel over the plurality of ports to the at least one of the network transmission equipment and the broadcast equipment of the service provider;
providing at least one server system configured to implement at least one of FTP, HTTP, NNTP, and SNTP protocols;
providing a multipoint parallel server distributed network connected to the data management section and configured to transmit the data packets, comprising at least one of files and file segments, to the data management section, the multipoint parallel server distributed network comprising a system resource unit connected to a plurality of memory units; and
providing a user transceiver including a plurality of ports configured to receive data transmitted in parallel through at least one of multiple frequencies and multiple channels from the at least one of the network transmission equipment and the broadcast equipment of the service provider, wherein the user transceiver is configured to:
initiate a TCP/IP session;
create a primary buffer;
connect to the system resource unit and request at least one file from the system resource unit;
create a plurality of subordinate buffers, wherein each of the plurality of subordinate buffers corresponds to at least one of the plurality of ports of the user transceiver;
establish a plurality of connections for the TCP/IP session and transmit to the system resource unit IP information comprising an amount of the plurality of ports of the user transceiver associated with the TCP/IP session;
receive into the plurality of subordinate buffers the at least one file from the multipoint parallel server distributed network through the plurality of connections of the TCP/IP session;
transmit the at least one file from the plurality of subordinate buffers to the primary buffer; and
assemble the at least one file using the primary buffer;
wherein the multipoint parallel server distributed network is configured to:
store the at least one file as at least one of a plurality of files and a plurality of file segments in the plurality of memory units; and
access the at least one of the plurality of files and the plurality of file segments in the plurality of memory units and transmit the at least one of the plurality of files and the plurality of file segments from the memory units in parallel through at least one of multiple frequencies and multiple channels to the subordinate buffers of the user transceiver utilizing TCP/IP protocol.

29. A method for enhanced network communications comprising:
providing a data management section configured for connection to at least one of a CATV content provider, a telephony service provider, a telephony subscriber, an Internet, a WAN, a MAN and a LAN, and configured for connection to at least one of a network transmission equipment and a broadcast equipment of a service provider;
receiving with the data management section data packets from the at least one of the CATV content provider, the telephony service provider, the telephony subscriber, the Internet, the WAN, the MAN and the LAN;
configuring the data management section with a plurality of ports;
routing the data packets with the data management section in parallel over the plurality of ports to the at least one of the network transmission equipment and the broadcast equipment of the service provider;
providing at least one server system configured to implement at least one of FTP, HTTP, NNTP, and SNTP protocols;
providing a multipoint parallel server distributed network connected to the data management section and configured to transmit the data packets, comprising at least one of files and file segments, to the data management section, the multipoint parallel server distributed network comprising a system resource unit connected to a plurality of memory units; and
providing a user transceiver including a plurality of ports configured to receive data transmitted in parallel through at least one of multiple frequencies and multiple channels from the at least one of the network transmission equipment and the broadcast equipment of the service provider, wherein the user transceiver is configured to:
initiate a TCP/IP session;
create a primary buffer;
connect to the system resource unit and request at least one file from the system resource unit;

create a plurality of subordinate buffers, wherein each of the plurality of subordinate buffers corresponds to at least one of the plurality of ports of the user transceiver;

establish a plurality of connections for the TCP/IP session and transmit to the system resource unit IP information comprising an amount of the plurality of ports of the user transceiver associated with the TCP/IP session;

receive into the plurality of subordinate buffers the at least one file from the multipoint parallel server distributed network through the plurality of connections of the TCP/IP session;

transmit the at least one file from the plurality of subordinate buffers to the primary buffer; and assemble the at least one file using the primary buffer;

wherein the multipoint parallel server distributed network is configured to:

store the at least one file as at least one of a plurality of files and a plurality of file segments in the plurality of memory units; and access the at least one of the plurality of files and the plurality of file segments in the plurality of memory units and transmit the at least one of the plurality of files and the plurality of file segments from the memory units in parallel through at least one of multiple frequencies and multiple channels to the subordinate buffers of the user transceiver utilizing TCP/IP protocol.

* * * * *